(12) United States Patent
Dealey, Jr. et al.

(10) Patent No.: US 6,238,075 B1
(45) Date of Patent: May 29, 2001

(54) LIGHTING SYSTEM FOR MASS-TRANSIT VEHICLES

(75) Inventors: Onward K. Dealey, Jr., Waterford; Ben V. Domas, Oakland; Alvin D. McCauley, Holly, all of MI (US)

(73) Assignee: Transmatic, Inc., Waterford, MI (US)

( * ) Notice: Subject to any disclaimer, the term of this patent is extended or adjusted under 35 U.S.C. 154(b) by 0 days.

(21) Appl. No.: 09/210,286

(22) Filed: Dec. 11, 1998

Related U.S. Application Data

(63) Continuation-in-part of application No. 08/767,969, filed on Dec. 17, 1996, now Pat. No. 5,857,758.

(51) Int. Cl.$^7$ ..................................................... B60Q 3/02
(52) U.S. Cl. ........................ 362/551; 362/223; 362/479; 362/496
(58) Field of Search ................................... 362/223, 581, 362/219, 576, 396, 225, 217, 478–481, 543, 544, 151, 224, 249, 329, 330, 332, 367, 294, 373; 248/56, 71, 74.2, 231.81, 316.77

(56) References Cited

U.S. PATENT DOCUMENTS

| | | |
|---|---|---|
| 2,372,874 | 4/1945 | Zimmerman . |
| 2,561,756 | 7/1951 | Shook . |
| 2,587,807 | 3/1952 | Arenberg et al. . |
| 3,210,875 | 10/1965 | Schwenkler . |
| 4,387,415 | 6/1983 | Domas . |
| 4,574,336 | 3/1986 | Mikalonis . |
| 4,704,660 | 11/1987 | Robbins . |
| 4,713,738 | 12/1987 | Davis . |
| 4,740,870 | 2/1988 | Moore et al. . |
| 4,811,172 | 3/1989 | Davenport et al. . |
| 4,947,293 | 8/1990 | Johnson et al. . |
| 4,947,305 | 8/1990 | Gunter, Jr. . |
| 5,113,322 | 5/1992 | Mikalonis . |
| 5,122,933 | 6/1992 | Johnson . |
| 5,136,491 | 8/1992 | Kano . |
| 5,184,883 | 2/1993 | Finch et al. . |
| 5,221,387 | 6/1993 | Robbins et al. . |
| 5,420,763 | 5/1995 | Vnderhoof . |
| 5,483,427 | 1/1996 | Dealey, Jr. et al. . |
| 5,857,758 | * 1/1999 | Dealey, Jr. et al. .................. 362/223 |

\* cited by examiner

Primary Examiner—Thomas M. Sember
Assistant Examiner—David V. Hobden
(74) Attorney, Agent, or Firm—Reising, Ethington, Barnes, Kisselle, Learman & McCulloch, PC

(57) ABSTRACT

A lighting system for preferentially illuminating the seating area of a mass-transit vehicle includes a light fixture with a lamp housing longitudinally disposed above the seating area. An electrically energized light source is mounted at at least one end of the light fixture. At least one solid-core semi-rigid light pipe extends from and is optically coupled to the light source. The light pipe receives light from the light source, transmits the light along its length, and emits the light laterally into the passenger compartment. The light pipe runs parallel to and is suspended from the lamp housing between the lamp housing and the seating area so that the lamp housing can direct laterally emitted light from the pipe into the seating area.

4 Claims, 17 Drawing Sheets

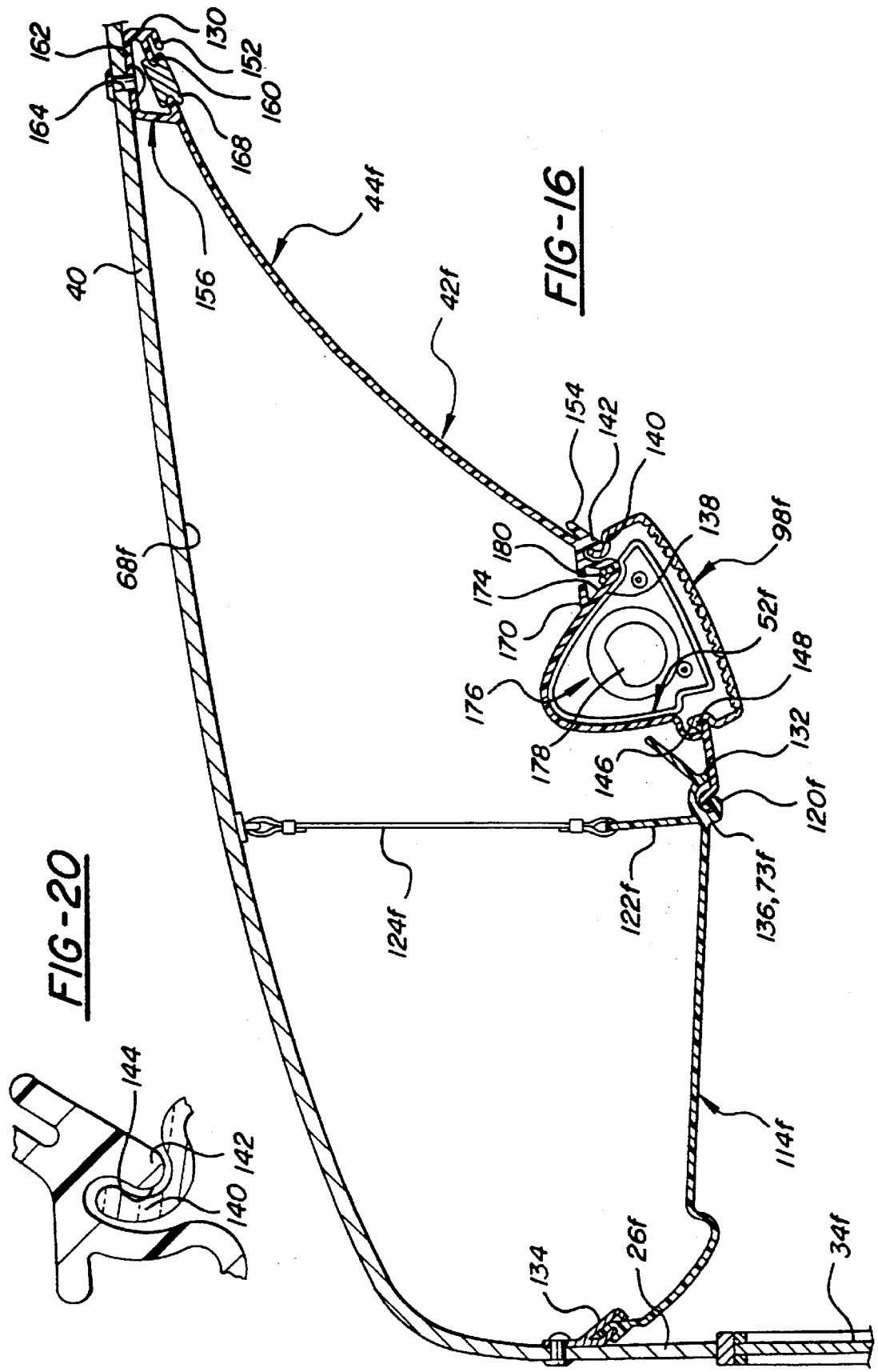

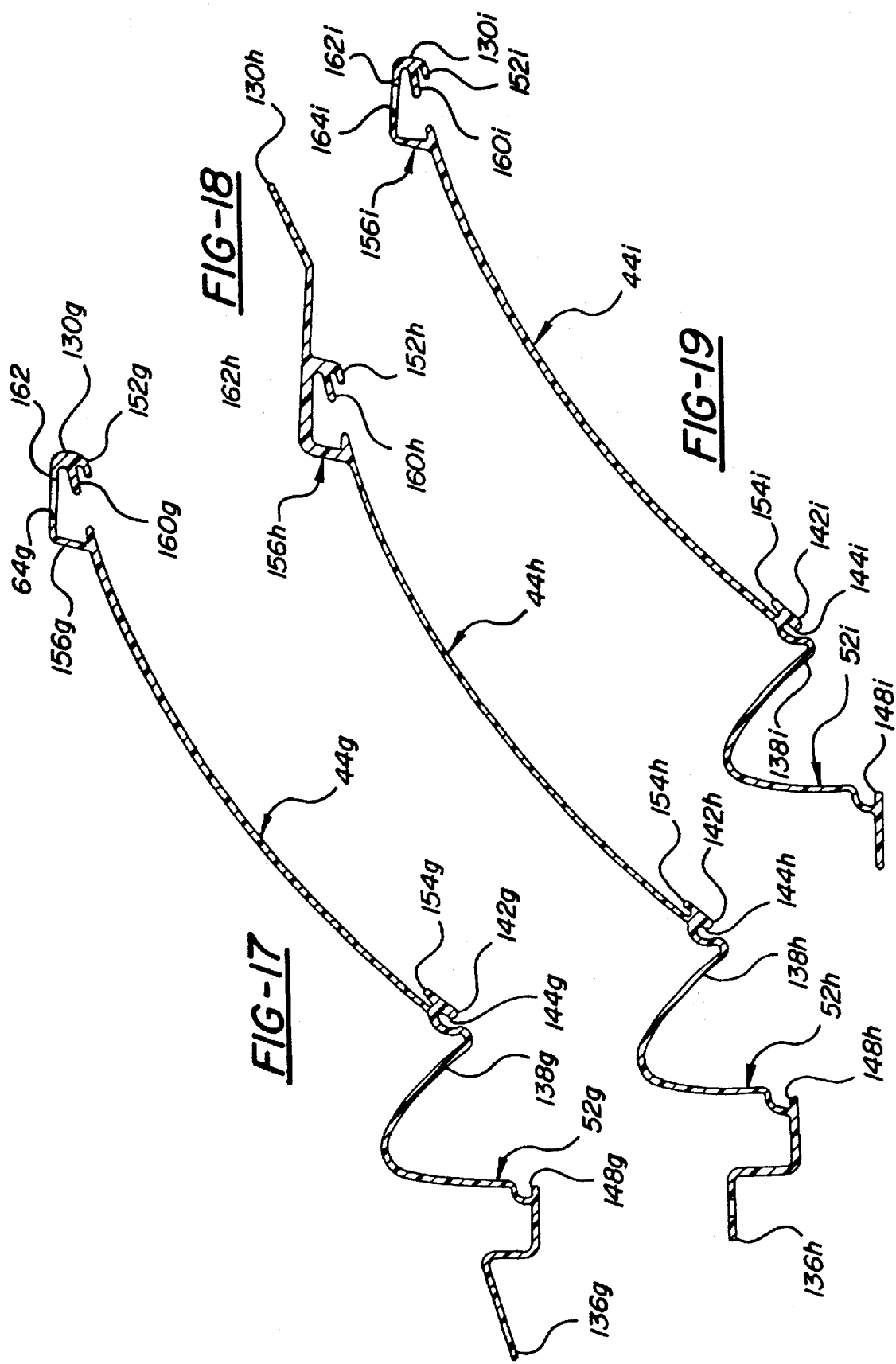

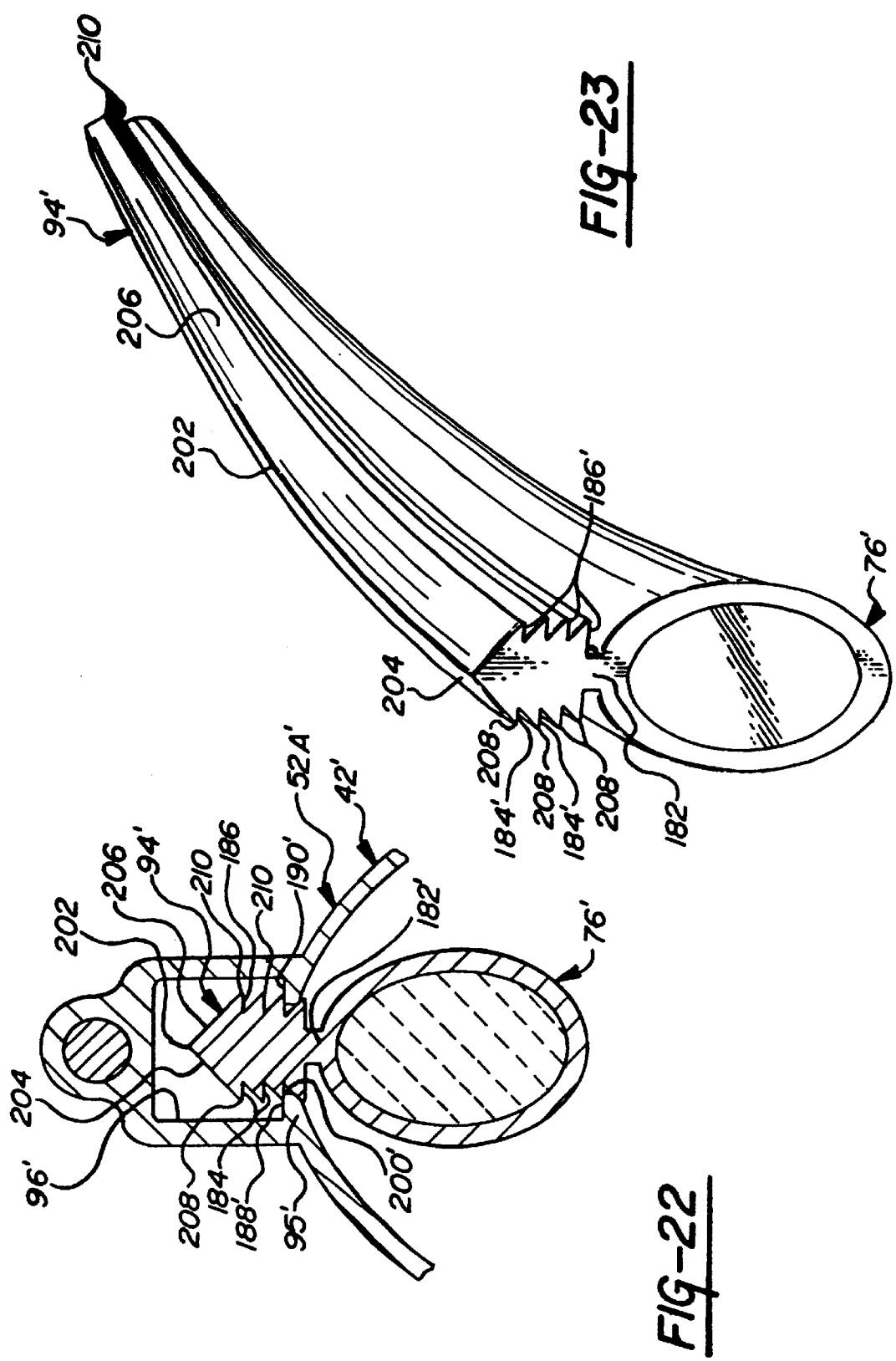

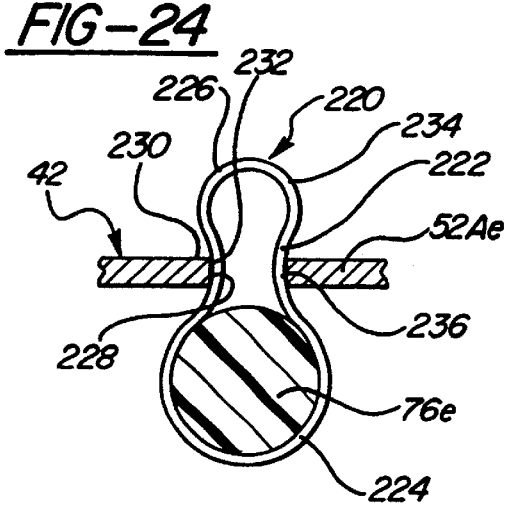
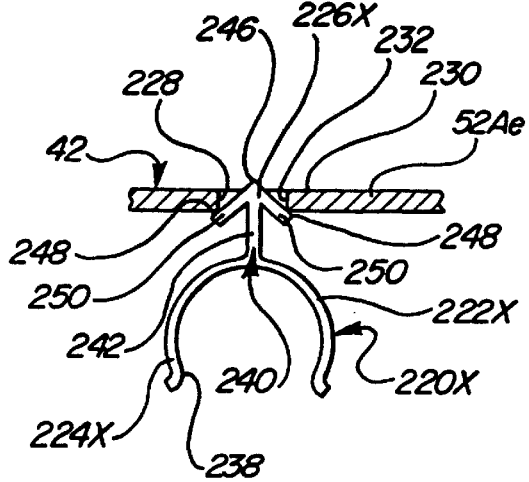
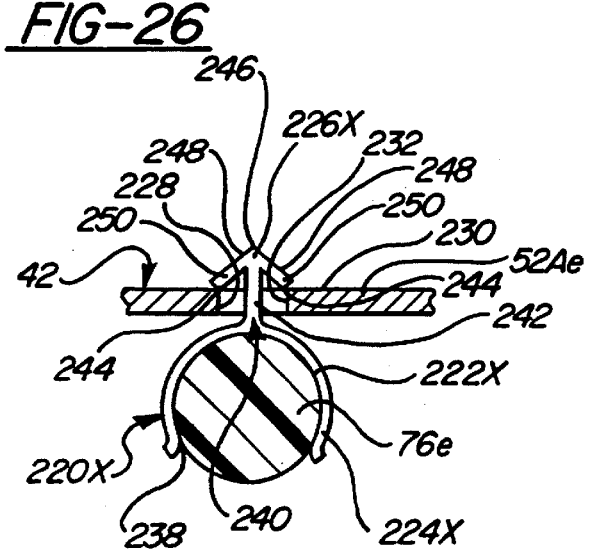
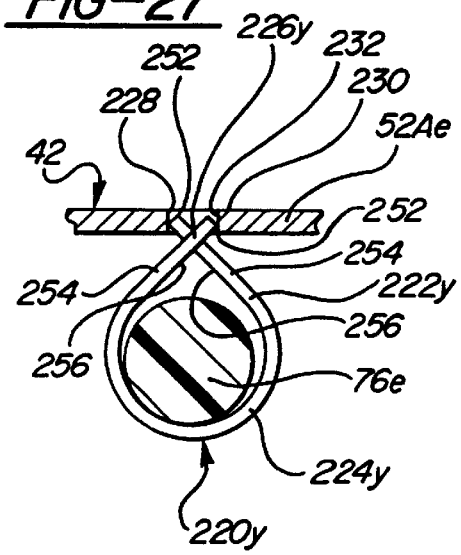
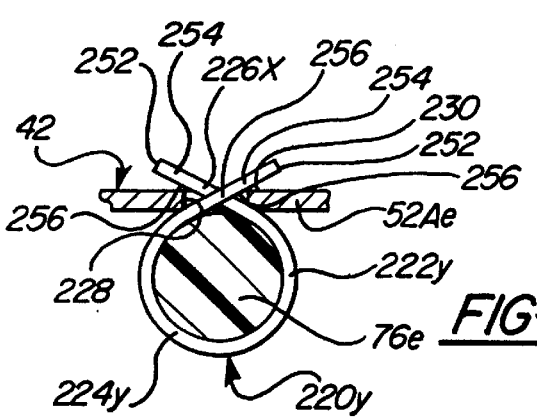

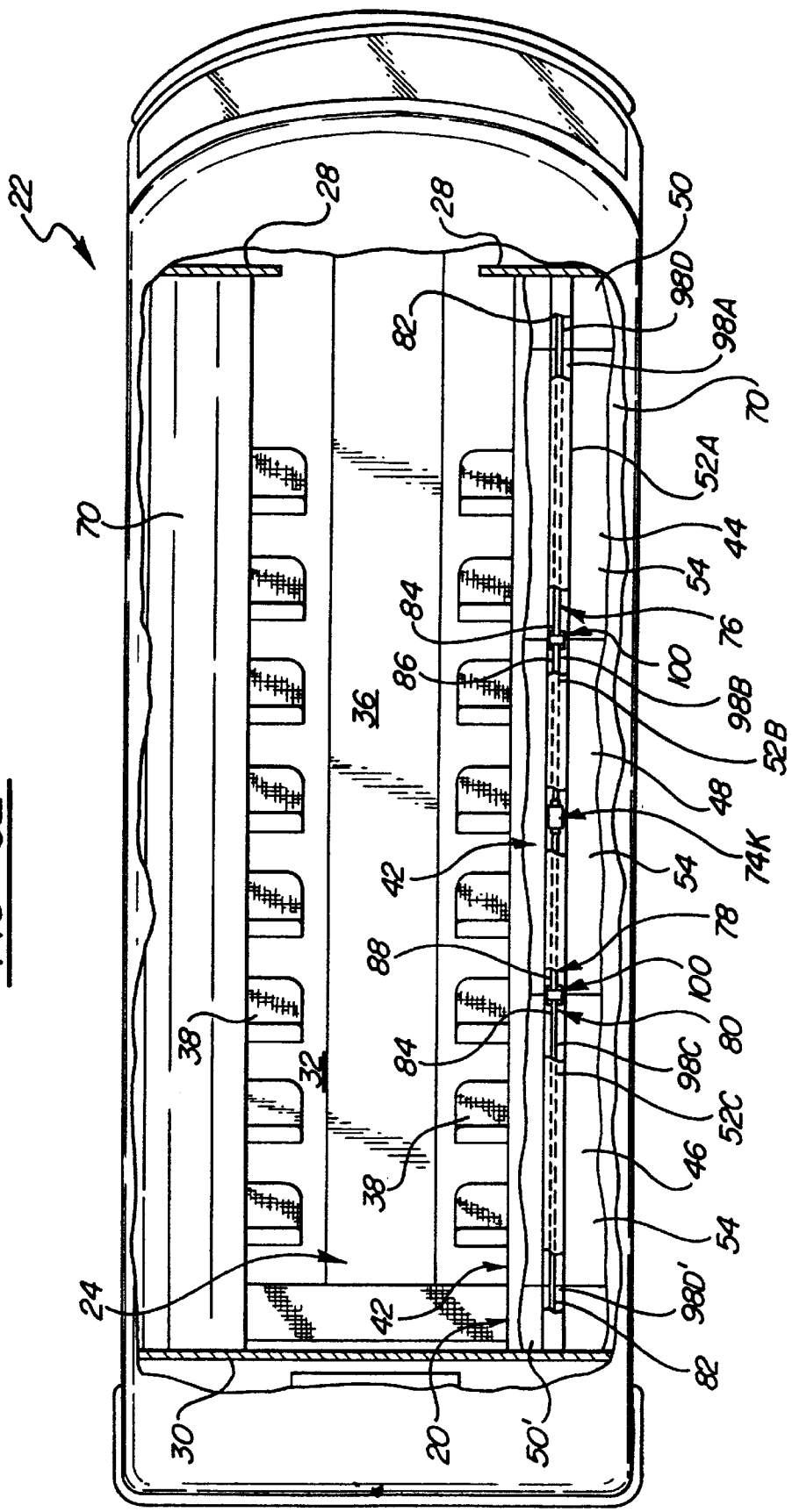

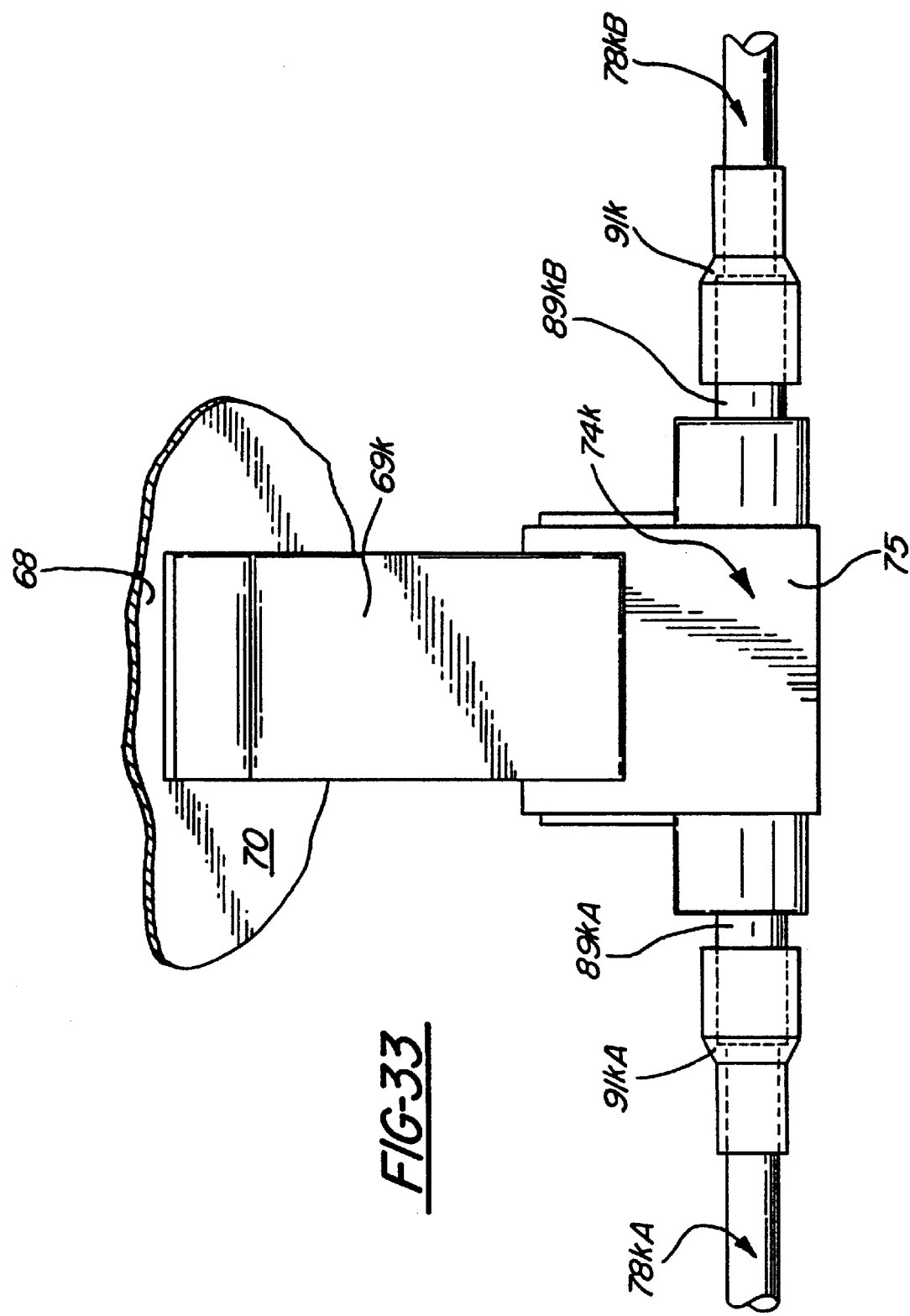

LIGHTING SYSTEM FOR MASS-TRANSIT VEHICLES

This application is a continuation-in-part application of Ser. No. 08/767,969 filed on Dec. 17, 1996, now U.S. Pat. No. 5,857,758.

TECHNICAL FIELD

This invention relates to mass transit vehicle lighting systems; more particularly, it relates to a lighting system for the passenger compartment of a bus using light pipes.

BACKGROUND OF THE INVENTION

Lighting systems for passenger seating areas in mass-transit vehicles frequently include a plurality of fluorescent lamps arranged in rows. Each row of lamps is commonly enclosed within an elongated channel that forms part of an elongated lamp housing. The elongated channel may be connected to or integrally formed with an elongated display panel for holding advertising cards. A lamp housing of this type will also typically include an elongated translucent or transparent light cover disposed across the open side of the channel to aid in controlling the distribution of light emitted from the lamps.

Together, the lamp housing and display panel make up an elongated light fixture. Such light fixtures are typically manufactured in long sections that mount end-to-end in the cornice areas above the passenger seating areas and above the vehicle side windows in mass-transit vehicles. U.S. Pat. No. 4,574,336 issued Mar. 4, 1986 to Mikalonis and U.S. Pat. No. 4,387,415 issued Jun. 7, 1983 to Domas disclose lighting systems of this type.

Fluorescent vehicle lighting systems are inherently difficult to service and require a considerable amount of maintenance. Fluorescent lamps frequently burn out and require replacement. When lighting systems use large numbers of lamps, the odds that one of the lamps will burn out over a given period of time increases. Therefore, the larger the number of lamps that a lighting systems uses, the more often that system will require bulb and ballast replacement.

Lighting systems that use multiple lamps also require multiple lamp sockets and complex wiring harnesses. Wiring harnesses for multiple-lamp lighting systems must connect every lamp socket to an electrical power source. In addition, the lighting fixtures housing the lamps and ballast must be designed to allow easy access for replacing lamps and ballast.

Systems using multiple lamps inherently leave "dark spots" between lamps. Rows of fluorescent lamps oriented end-to-end leave dark spots where the ends of each lamp plug into a socket and no light is emitted. The dark areas between the lamps are difficult to minimize without extending the lengths of the lamps.

When confronted with applications requiring linear light sources, designers have sometimes turned to fiber optics. Advances in fiber optic technology have made it possible to manufacture linear light sources that can efficiently distribute light both laterally from their circumferences as well as longitudinally from their ends. This type of product is known as a "side-light" or "side-fire" optic or a "side-fire" light pipe.

Lumenyte International Corporation manufactures a "side-fire" light pipe that includes a solid acrylic core with either a circular or an oval cross-section. The diameter of the core is approximately one-half of an inch. A Teflon® cladding surrounds the core and has an index of refraction that causes the light pipe to emit light laterally. A clear jacket surrounds the cladding to reflect a certain amount of light back into the core.

Also available from Lumenyte International Corporation is the LUMENYTE® STARBURST™ OPTIC—a side-fire light pipe with small angled cuts along its length. The cuts create optical discontinuities along the length of the light pipe that increase the amount of light emitted laterally. The depth, angle and spacing of these cuts can be varied to customize light distribution to suit a particular application.

The prior art also includes fiber optic lighting systems that have been proposed for use in vehicular applications. An example of a proposed vehicular application of fiber optic technology is described in U.S. Pat. No. 4,947,293 issued to Johnson et al. The Johnson et al. patent discloses a clearance lighting system for a semi trailer cargo container body. The system includes a light source that end-illuminates elongated light-conducting strips. The strips are supported along both sides of a container body and emit light both longitudinally and laterally. Another Johnson patent, U.S. Pat. No. 5,122,933, discloses a similar fiber optic lighting system that includes a message panel. However, the lighting systems disclosed in the later two patents are not adapted to preferentially distribute light into the passenger seating area of a mass transit vehicle.

Another example of a vehicular application for fiber optic technology is disclosed in U.S. Pat. No. 4,740,870 issued to Moore et al. The Moore et al. patent discloses a fiber optic lighting system for boats. The system includes a plurality of "end-fire" fiber optic cables that each receive light at one end from a central light source. The cables conduct light longitudinally to light fixtures located at remote locations within a boat.

Two other examples are disclosed in U.S. Pat. No. 4,811,172 to Davenport et al. and U.S. Pat. No. 5,184,883 to Finch et al. Each of these patents discloses a fiber optic lighting system for motor vehicles. The systems include a light source that end-illuminates a plurality of fiber optic filaments. The filaments conduct the light longitudinally to the vehicle head and tail lamp fixtures.

There remains a need for lighting systems that can supply sufficient illumination to meet lighting requirements in passenger seating areas of mass-transit vehicles while reducing the amount of lamps, wiring and maintenance that current systems require.

SUMMARY OF THE INVENTION

In accordance with this invention, an improved lighting system is provided for illuminating a passenger seating area in a mass transit vehicle. The improved system replaces fluorescent tubes with one or more optically coupled light pipes. The light pipes extend between elongated lamp housing sections and the passenger seating area to preferentially distribute light into the passenger seating area while reducing the amount of lamps and maintenance required.

Light pipes may be formed into segments much longer than a fluorescent tube thus minimizing the number of "dark spots" along the length of a light fixture. Because they conduct light, several shorter light pipes may be arranged end-to-end, in series, to extend from a single light source. Consequently, with the exception of the light source, there are no lamps to burn out and require replacement. Such a system does not need complex wiring harnesses because there are fewer lamps and therefore fewer lamp sockets requiring electrical power. Moreover, light sources for illuminating light pipes can be selected that do not require the heavy inverter ballasts that fluorescent lamps require.

According to another aspect of this invention, a lighting system is provided which can be used with either light pipes or fluorescent lamps. The system includes a plurality of light fixtures, each having a pair of end caps disposed at either end of an elongated lamp housing. Each end cap may include either a D-shaped through hole to receive a fluorescent bulb socket or a circular hole to receive a light pipe.

According to another aspect of this invention, an elongated mounting fin integrally and laterally extends from along the length of each light pipe. Each mounting fin either snaps laterally or slides longitudinally into an elongated slot in a lamp housing section. Each fin supports the light pipe it extends from without interrupting the light that the light pipes emit into the seating area.

According to another aspect of this invention, each light fixture additionally includes an air duct extension panel. Each air duct extension panel is adapted to mount between the vehicle side wall and a face panel to space the face panel from the side wall. Each air duct extension panel has an inner edge connected to the face panel lower edge, and an outer edge connected to the vehicle side wall.

According to still another aspect of this invention, each lamp housing section is formed together with one of the air duct extension panels in a position adjacent and generally parallel to the air duct extension panel inner edge. Each face panel is detachably connected along its lower edge to a corresponding duct extension panel. This configuration allows the face panel to be removed from the light fixture without, at the same time, removing the lamp housing from the light fixture.

According to another aspect of the invention, a light pipe hanger device is provided for suspending a light pipe from a supporting structure in, for example, a light fixture. The device comprises a band of resilient material that includes a lower hoop. The lower hoop is configured to wrap around the light pipe to be suspended. A connector is attached to the lower hoop and is configured to fasten the hanger device to the supporting structure. Unlike prior art hangers the connector comprises an upper probe portion that integrally extends from the lower hoop and is configured to engage an opening in the supporting structure to suspend the hanger device and the light pipe from the supporting structure.

According to another aspect of the invention, the lower hoop and the upper probe portion of the hanger device are a single unitary piece.

According to another aspect of the invention, the device includes a resilient portion configured to allow the upper probe portion to compress sufficiently to pass upward through the opening and to spring back toward a relaxed shape. The relaxed shape allows the probe portion to engage a rim defining the opening in the supporting structure and to resist being pulled back downward through the opening.

According to another aspect of the invention, the lower hoop is a band of the resilient material.

According to another aspect of the invention, the device comprises a length of spring metal bent to form the lower hoop and upper probe portions.

According to another aspect of the invention, the device comprises a plastic material. The plastic material may be translucent or transparent to preclude the device from blocking light radiating from a side-fire light pipe.

According to another aspect of the invention, the upper probe portion comprises an arcuate lobe. The arcuate lobe and lower hoop together form a closed arcuate band having the general shape of a pair of opposing lobes integrally merging at a pinched region. The arcuate lobe is broader than the opening in the supporting structure and is laterally compressible to fit through the opening when pushed upward through the opening.

According to another aspect of the invention, the lower hoop includes a circumferential gap configured to receive the light pipe in snap-in engagement. The snap fit feature provides a quick and easy method for installing light pipes in the light fixture.

According to another aspect of the invention, the upper probe portion comprises a mounting fin that includes a stem extending integrally upward from the lower hoop of the light pipe hanger. The stem is disposable within the opening in the supporting structure. The mounting fin additionally includes a first engagement surface disposed adjacent the stem. The first engagement surface is configured to engage the supporting structure once the mounting fin has been pushed through the opening.

According to another aspect of the invention the fin includes a second engagement surface disposed adjacent the stem. The first and second engagement surfaces are disposed on laterally opposite sides of the stem and together provide greater stability.

According to another aspect of the invention, the fin includes an apex defining a fin upper edge. In addition, a pair of ramp surfaces tapers outward and downward from the apex to an outer edge of each of the fin engagement surfaces to form a pair of barbs.

According to another aspect of the invention, the stem is sufficiently narrower than the opening. This is to allow the barbs to fit through the opening with the stem by folding against the stem. Once the fin is through the opening, the barbs will "deploy" into a position that they cannot easily be drawn back down through the opening from.

According to another aspect of the invention a method is provided for installing a light pipe in a light fixture using the above hanger device. The method includes inserting the fin upper edge upward into the opening in the lamp-support panel with the fin ramp surfaces engaging a rim defining the opening in the lamp support panel, forcing the fin through the opening such that contact with the rim causes the elongated barbs to first compress inward against the elongated stem and to then spring back outward after passing through the opening with the barbs spread-out across the opening, and snapping a light pipe into the lower hoop by pushing the light pipe sideways through the gap in the lower hoop.

According to another aspect of the invention, opposite ends of the band of resilient material are drawn together and crossed forming the lower hoop. The upper probe portion comprises opposite terminal lengths of the band extending diagonally upward and outward from a cross point where the two terminal lengths cross. Each terminal length additionally includes an engagement surface configured to engage the supporting structure when the upper probe portion has been moved through the opening in the supporting structure.

According to another aspect of the invention, the hanger device band has a relaxed state in which the terminal lengths are crossed. In the relaxed state, the distance between the crossed ends of the band is greater than a distance across the opening. In addition, in the relaxed state, the lower hoop may have a diameter less than a diameter of a light pipe to be suspended in the hoop.

According to another aspect of the invention, a method is provided for installing the above light pipe in a light fixture.

The method includes expanding the lower hoop of the hanger such that the upper ends of the probe prongs move close enough together to pass through the opening in the lamp-support panel, inserting the upper ends of the probe prongs through the opening, releasing the lower hoop to allow the hoop to contract back toward a pre-expanded/ relaxed position in which the upper ends of the probe prongs are spread far enough apart to engage opposing sides of a rim defining the opening and suspending the hanger from the lamp-support panel and inserting the light pipe axially through the lower hoop to suspend the light pipe and to prevent the hoop from closing, pulling the prongs together and releasing the light pipe.

According to another aspect of the invention, from the cross point each terminal length extends diagonally upward and outward then forms a detent configured to engage opposite edges of the opening. The detent engages the edges when the upper probe portion has been moved partially through the opening. The terminal lengths are inwardly compressible to a compressed position that allows the terminal lengths to pass through the opening in the supporting structure.

According to another aspect of the invention, each detent comprises a generally vertical section of one of the terminal lengths that integrally extends in a generally vertically upward direction from an upper end of the diagonally extending portion of that terminal length. The generally vertical sections of the terminal lengths may also include generally arcuate intermediate portions having generally concave surfaces that face laterally outward and are configured to engage the opposite edges of the opening when the upper probe portion has been moved partially through the opening.

According to another aspect of the invention, each terminal length of the band includes a diagonally inwardly and upwardly extending upper ramp that integrally extends from an upper end of the intermediate portion of the terminal length. Each upper ramp has an engagement surface configured to aid in guiding the upper probe portion into the opening. The upper ramps allow an operator to push the upper probe portion into the opening without having to first squeeze or compress the terminal lengths together.

According to another aspect of the invention, a method is provided for installing a light pipe in a light fixture. The method includes placing the prongs in contact with opposing sides of a rim defining the opening in the lamp-support panel, pushing the hanger device upward until the prongs engage opposing the sides of the rim and the lower hoop is expanded sufficiently to receive the light pipe, inserting the light pipe axially through the expanded lower hoop of the hanger device, pushing the hanger device farther upward until the prongs disengage from the rim, move upward through the opening and splay upward and outward over the lamp-support panel as the lower hoop closes inward around the light pipe.

According to another aspect of the above method, an upper engagement surface of a ramp portion of each prong is initially placed in contact with opposing sides of the rim. Pushing the hanger device upwards causes the prongs to move inward toward each other as the ramp portions slide upward along the opposite sides of the rim. The hanger device is pushed upwards until detent portions of the prongs engage the rim, holding the lower hoop open for light pipe insertion. Once a light pipe has been inserted, the hanger device is pushed upward until the detent portions disengage from the rim. This arrangement provides a quick and easy way for an installer to install a light pipe in a light fixture.

According to another aspect of the present invention, the lighting system includes a dual-port light source mounted in the vehicle. First and second elongated light pipes each have an input end optically coupled to the light source to receive light therefrom. The light pipes extend from the light source in generally opposite directions above the seating area adjacent the lamp housing. Each dual-port light source reduces by one the number of light sources required to illuminate the light fixture without an excessive loss of lateral illuminating power at portions of the light pipe/pipes remote from the light source/sources.

To better understand and appreciate the invention, refer to the following detailed description in connection with the accompanying drawings:

BRIEF DESCRIPTION OF THE DRAWINGS

FIG. 10 is a detail view of a light pipe extending between two light sources;

FIG. 16 is a cross-sectional end view of a fifth light fixture embodiment constructed in accordance with this invention;

FIG. 17 is a cross-sectional end view of an alternative face panel;

FIG. 18 is a cross-sectional end view of another alternative face panel;

FIG. 19 is a cross-sectional end view of yet another alternative face panel;

FIG. 20 is a broken-out cross-sectional end view of the roll-in lens connector arrangement shown in FIG. 16;

FIG. 22 is a cross-sectional end view of an alternative light pipe mounting arrangement;

FIG. 23 is a perspective view of a light pipe having the alternative mounting arrangement of FIG. 22;

FIG. 24 is an end view of an alternative light pipe mounting clip constructed according to the invention and suspending a light pipe from a support structure with the light pipe and support structure shown in cross-section;

FIG. 25 is an end view of another alternative light pipe mounting clip constructed according to the invention and engaging an opening in a support structure, the support structure being shown in cross-section;

FIG. 26 is an end view of light pipe mounting clip of FIG. 25 suspending a light pipe from a support structure with the light pipe and support structure shown in cross-section;

FIG. 27 is an end view of another alternative light pipe mounting clip holding a light pipe and engaging an opening in a support structure, the light pipe and support structure being shown in cross-section;

FIG. 28 is an end view of the light pipe and mounting clip of FIG. 27 with the clip suspending the light pipe from a support structure;

FIG. 32 is a partial-cutaway top view of the vehicle shown in FIG. 1 including light fixtures constructed according to the invention and including two dual-port light engines rather than four single-port light engines;

FIG. 33 is a front view of a dual-port light engine of FIG. 32.

DETAILED DESCRIPTION OF THE PREFERRED EMBODIMENT

Figure 1:
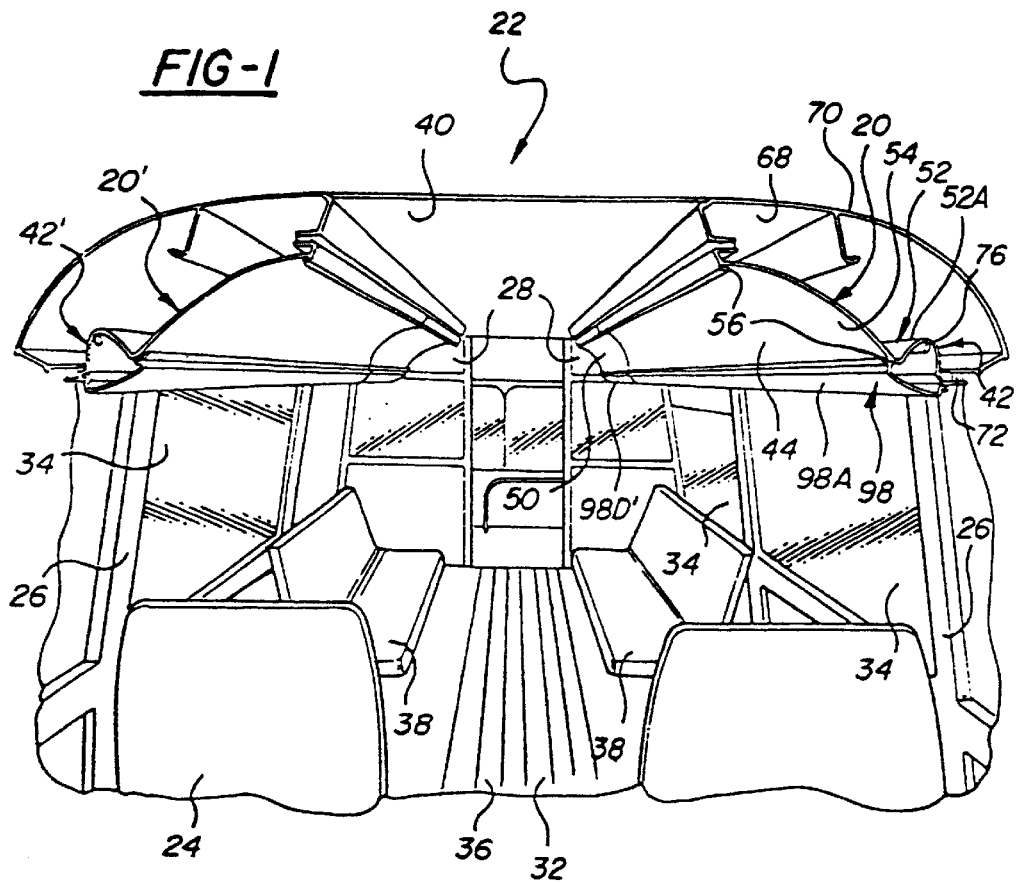
FIG. 1 is a perspective view of a vehicle interior having light fixtures according to the invention.

A first embodiment of a lighting system for mass-transit vehicles is generally indicated at 20 and 20' in FIGS. 1–4. The lighting system 20, 20' is installed in a mass transit vehicle 22 that includes a passenger compartment, generally indicated at 24 in FIGS. 1–3. The passenger compartment 24 is defined by two side walls 26, a forward bulkhead 28 and an aft bulkhead 30, a floor 32 and a ceiling 40. The forward bulkhead 28 is located at the forward end of the passenger compartment and the aft bulkhead 30 is located at the aft end. The passenger compartment 24 includes side windows 34 located in the side walls 26. The floor 32 includes an aisle 36 extending along the longitudinal axis of the vehicle 22 between two passenger seating areas 38. The ceiling 40 extends between the side walls 26 from the forward bulkhead 28 to the aft bulkhead 30. The passenger compartment 24 includes two cornice areas defined as the regions where the two side walls 26 join the ceiling 40. Portion 20 of the lighting system is supported in one cornice area and portion 20' is supported in the opposite cornice area. An elongated vehicle duct panel 70 may also be fixed into the cornice area.

Figure 2:
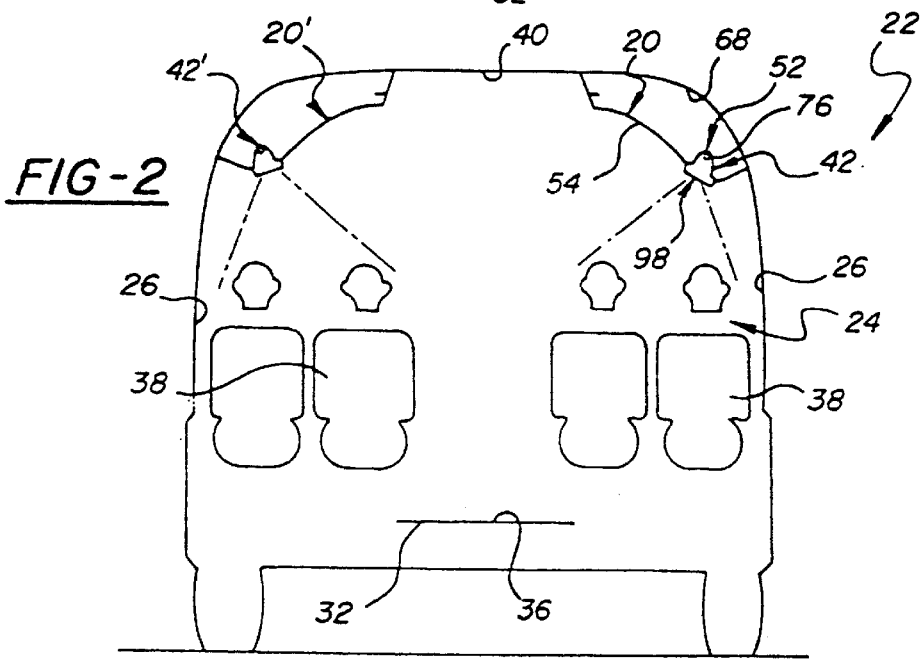
FIG. 2 is a cross-sectional view of a vehicle schematically showing the lighting pattern from the fixtures according to the invention.
Figure 3:
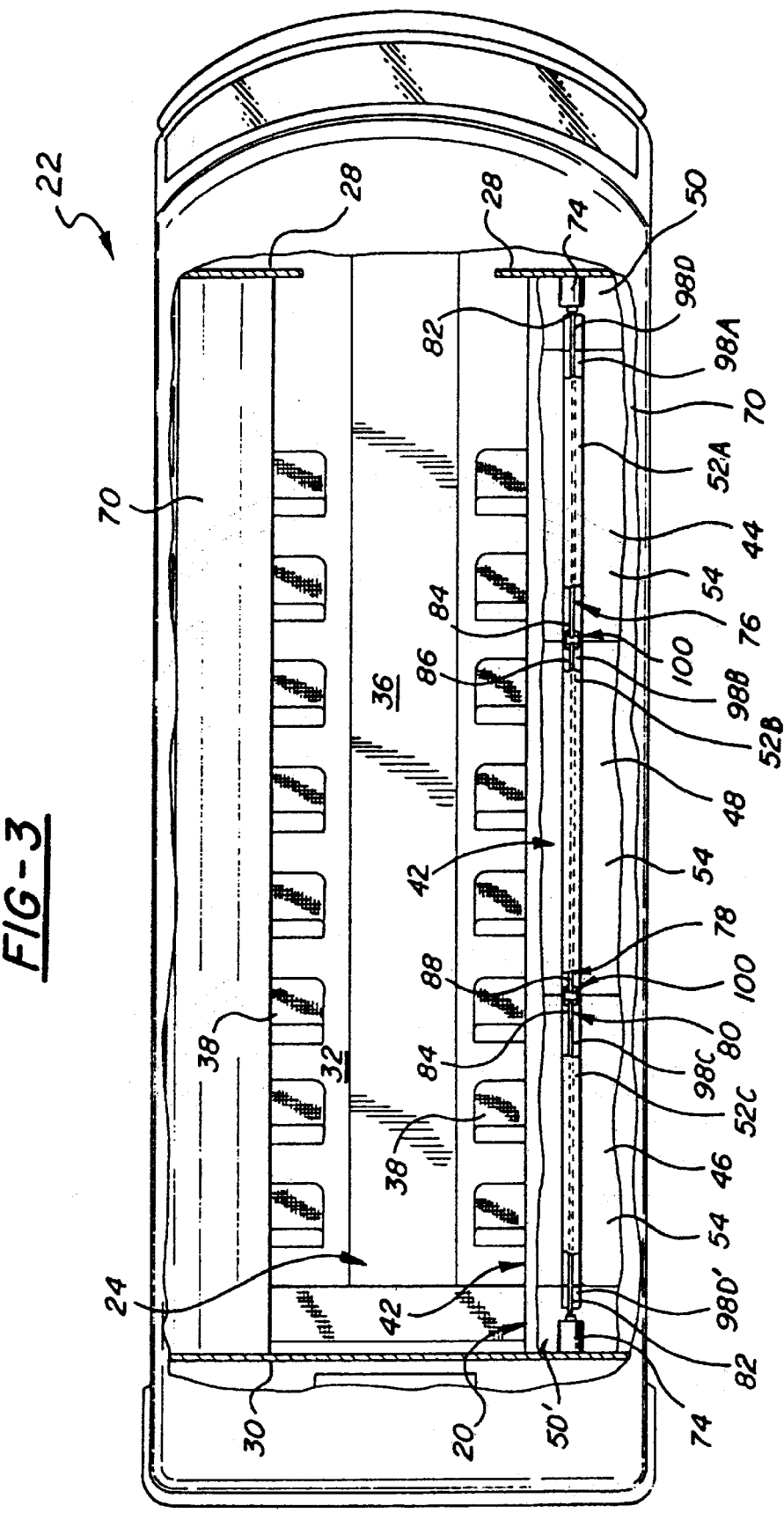
FIG. 3 is a partial-cutaway top view of the vehicle shown in FIG. 1.

Because lighting system portions 20, 20' have the same general construction, only lighting system 20 will be described in detail. As shown in FIGS. 1, 2 and 3, the lighting system 20 includes an elongated light fixture 42 installed longitudinally in one of the cornice areas in the passenger compartment 24 of the vehicle 22. One light source 74 is mounted at each end of the light fixture 42 adjacent a bulkhead 28, 30. Three elongated light pipes 76, 78, 80 are optically-coupled end-to-end and extend between the two light sources 74. (Other embodiments may, of course, include a greater or a smaller number of light pipes.) The light pipes 76, 78, 80 receive light from the light sources 74, transmit it along their lengths and laterally emit it from along their lengths into the passenger compartment 24. The light fixture 42 also includes an elongated segmented lamp housing 52 that runs parallel to the light pipes 76, 78, 80 and preferentially directs light into the seating area 38 from the light pipes 76, 78, 80. Two coupler means 100 are supported at spaced locations along the lamp housing 52 to slidably support optically-coupled ends 84, 86, 88 of the light pipes 76, 78, 80.

As shown in FIG. 3, the light fixture 42 includes five face panels 44, 46, 48, 50, 50' disposed end-to-end and longitudinally extending above the seating area 38 from the aft bulkhead 30 to the forward bulkhead 28. The three panels include a 12 foot-long forward face panel 44 disposed in the forward end of the passenger compartment 24, a 12 foot-long aft face panel 46 disposed in the aft end of the passenger compartment 24, a center face panel 48 disposed between the forward 44 and aft 46 face panels, a forward access face panel 50 abutting the forward bulkhead 28, and an aft access face panel 50' abutting the aft 30 bulkhead. The length of the center face panel 48 varies according to the length of the passenger compartment 24. Face panels 44, 46 and 48 have generally identical cross-sections as viewed longitudinally down the length of the passenger compartment 24.

As is best shown in FIGS. 1 and 2, the segmented lamp housing 52 is longitudinally disposed in the light fixture 42. The segmented lamp housing 52 is made-up of three interconnecting lamp housing segments 52A, 52B, 52C each shaped and aimed to preferentially direct light to the seating area 38 below and to minimize illumination of the aisle 36 and side windows 34. The lamp housing segments are aligned end-to-end to form the segmented lamp housing. Each segment 52A, 52B, 52C of the lamp housing 52 is disposed in one of the face panels 44, 46, 48, 50, 50'. A forward lamp housing segment 52A is disposed in the forward face panel 44, an aft lamp housing segment 52B is disposed in the aft face panel 46, a center lamp housing segment 52C is disposed in the center face panel 48. Each lamp housing segment 52A, 52B, 52C has the shape of a concave channel with a parabolic cross-section. The cross-sectional shape of each lamp housing segment 52A, 52B, 52C may also be elliptical, semi-circular or any other suitable shape. The curved inner surface of each panel segment 52A, 52B, 52C may include a light reflecting, refracting, diffusing or absorbing surface—depending on the amount of illumination desired for a given application.

Each face panel 44, 46, 48 includes a gently-curved display panel 54 and upper and lower grooved borders 56 for holding advertising cards. The lower edges of each face panel 44, 46, 48, 50, 50' include an elongated, downwardly-curved roll-in hook 73 for mounting the panels 44, 46, 48, 50, 50' in another embodiment. In the first embodiment, the hooks 73 serve no purpose.

Figure 4:
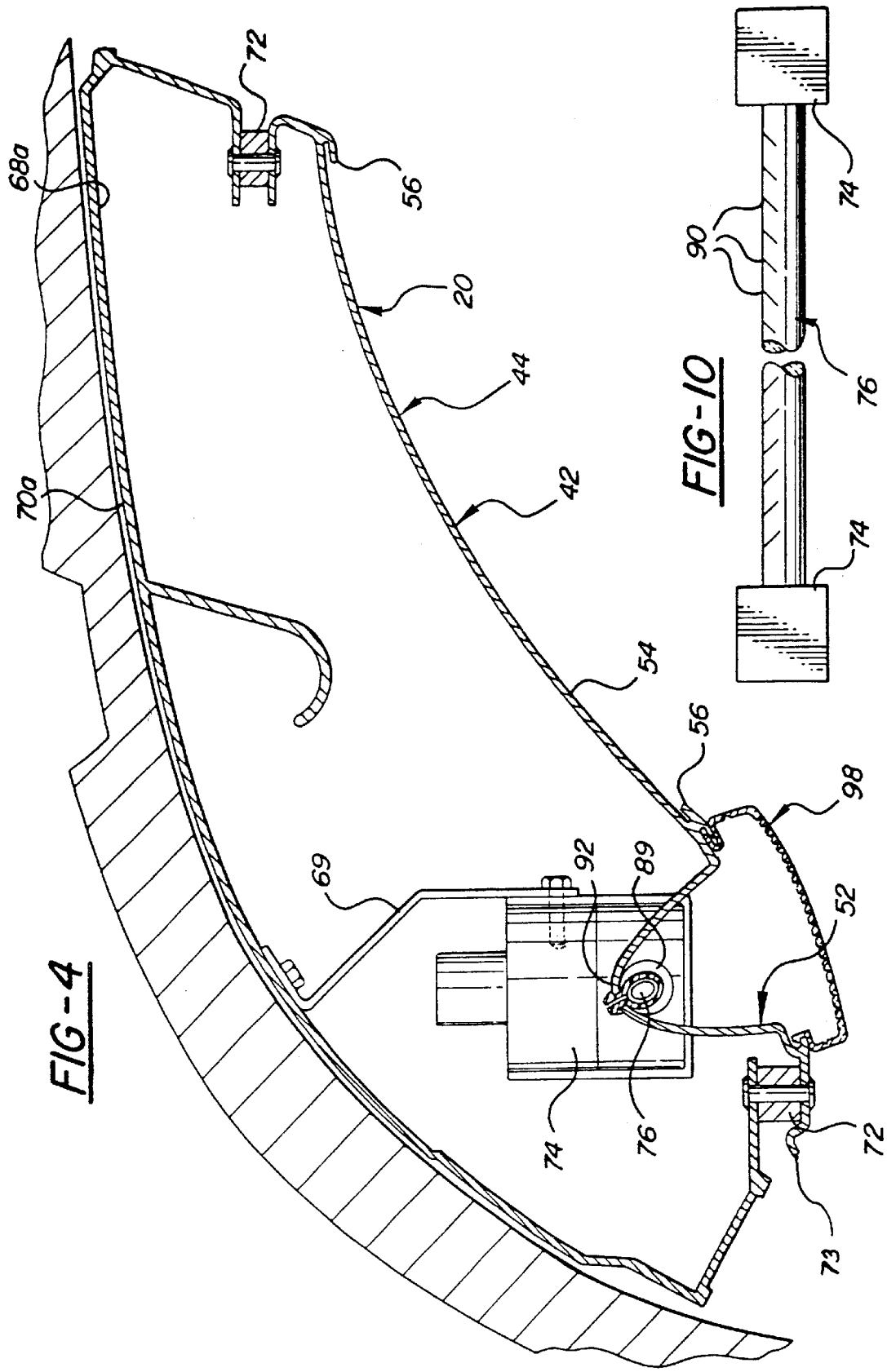
FIG. 4 is a cross-sectional end view of a light fixture constructed in accordance with this invention.

Each face panel 44, 46, 48, 50, 50' is made as a pultrusion from opaque resin and glass fibers to have an elongated shape of a uniform cross-section along its length. Each segment of the lamp housing 52 is integrally pultruded with one of the face panels 44, 46, 48, 50, 50' to form a unitary piece. As shown in FIGS. 1, 2, and 4, each lamp housing segment 52A, 52B, 52C is disposed below the bottom edge of the display panel 54 in its respective face panel 44, 46, 48, 50, 50'.

The light fixture 42 encloses and defines an elongated air duct as shown at 68 in FIGS. 1, 2 and 4. The face panels 44, 46, 48, 50, 50' serve as the inner walls of the duct 68. The remainder of the duct 68 is defined by the vehicle duct panel 70. Each face panel 44, 46, 48, 50, 50' is fastened along its top and bottom edges to the vehicle duct panel 70. As is shown in FIG. 4, spacers 72 are included between the face panels 44, 46, 48, 50, 50' and the vehicle duct panel 70 to allow conditioned air, either heated or cooled, to pass from the duct 68 into the passenger compartment 24. In other embodiments, the face panels 44, 46, 48, 50, 50' may be fastened directly to the side wall 26 of the passenger compartment 24 in a cornice area rather than to a vehicle duct panel 70.

Two single-port light sources, shown at 74 in FIGS. 3, 4, 5, 7, 10 and 15, are mounted in the vehicle 22 adjacent the passenger compartment 24. More specifically, one light source 74 is mounted at each end of the fixture 42 with each light source 74 disposed behind one of the two access face panels 50, 50' adjacent the forward 28 and aft bulkheads 30. Each light source 74 includes a cylindrical receptacle 89 configured to receive one end of a light pipe. The light sources 74 are mounted behind the access face panels 50, 50' to allow easy access for maintenance and replacement of light source components such as burned-out bulbs.

In other embodiments, there may be more or fewer light sources 74 and they may be mounted at any location within the vehicle 22. In addition, as shown in FIGS. 32 and 33, each light fixture 42 may include a single dual-port light source 74$k$ rather than two single-port light sources 74. The dual-port light source 74$k$ includes two receptacles shown at 89$k$ A, 89$k$ B in FIG. 33. The receptacles 89$k$ A, 89$k$ B extend in opposite directions from a central lamp housing 75 of the light source 74$k$. The dual-port light source 74$k$ is supported within the fixture 42 approximately midway along the length of the fixture 42 rather than at opposite ends of the light fixture 42 as with the single-port light sources 74 of FIGS. 3, 4, 5, 7, 10 and 15.

Figure 5:
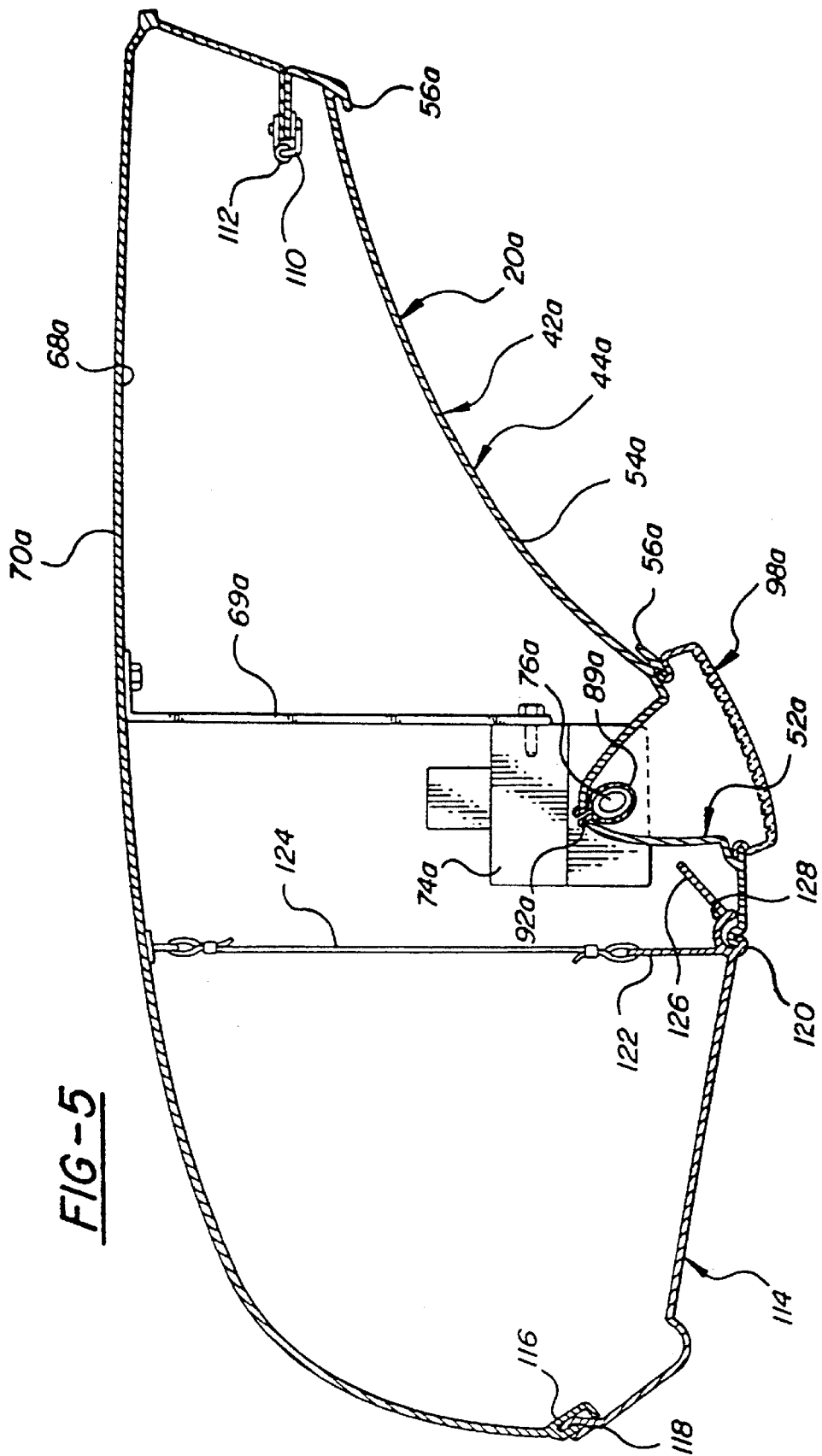
FIG. 5 is a cross-sectional end view of a second light fixture embodiment constructed in accordance with this invention.
Figure 7:
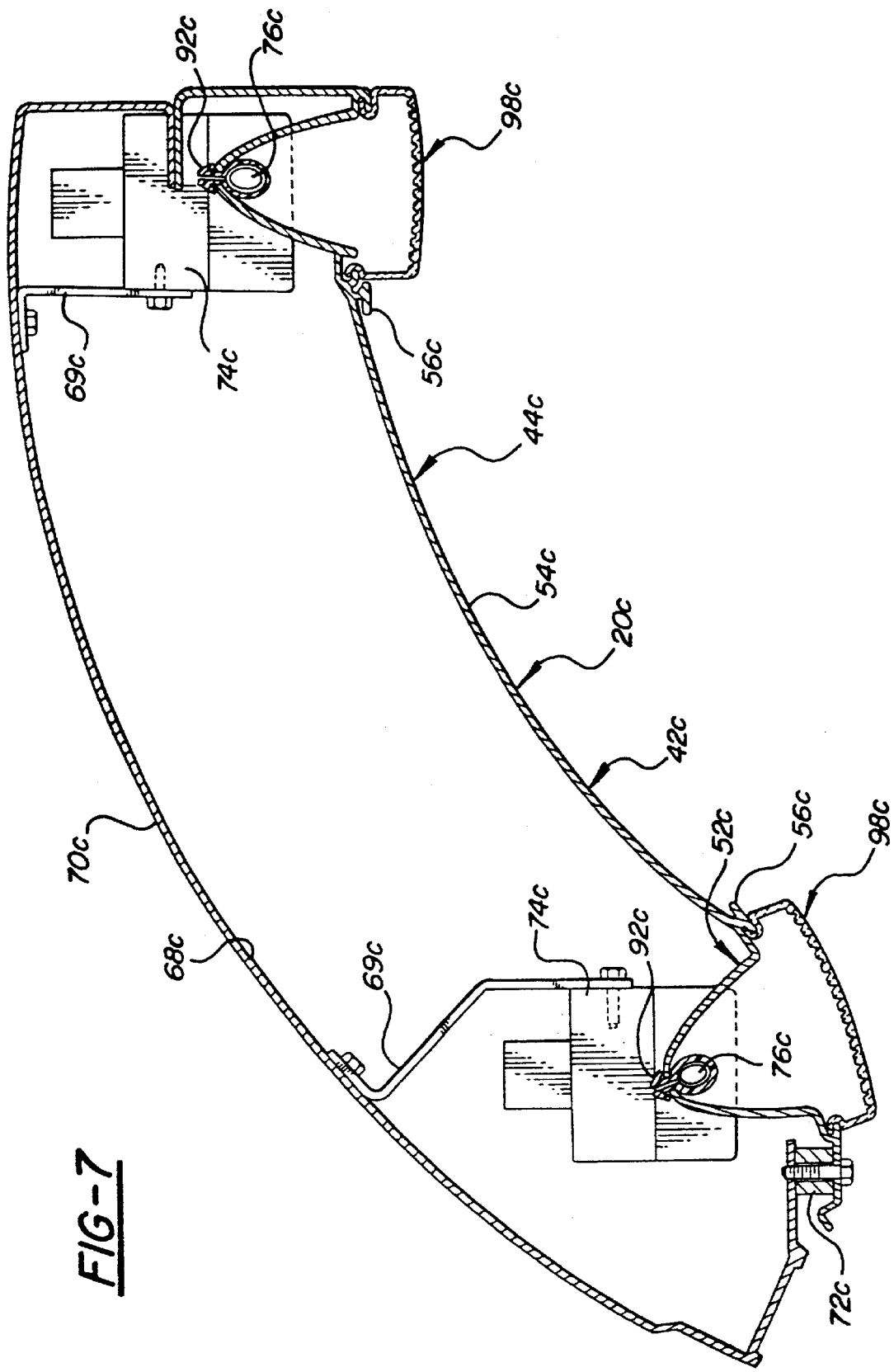
FIG. 7 is a cross-sectional end view of a fourth light fixture embodiment constructed in accordance with this invention.

As shown in FIGS. 4, 5 and 7, the light sources 74 are disposed within the air duct 68 that runs through the fixture 42. In operation, the flow of cool air through the air duct 68 can help the light sources 74 convectively reject heat.

The light sources 74, commonly known as "light engines", are electrically-energized and include halogen illuminators. The illuminators may be quartz-halogen or may use a metal halide illuminator such as that described in U.S. Pat. No. 4,704,660 granted Nov. 3, 1987 to Robbins et al. Such light sources 74 are available from General Electric Company and Lumenyte International Corporation.

The lighting system 20 includes a switch mounted in the vehicle 22 and an electrical energizing circuit that extends from the switch to each light source 74. The switch may be of any suitable type known in the art.

The lighting system 20 includes three elongated light pipes, generally indicated at 76, 78 and 80 in FIGS. 1–12 and 15. The light pipes 76, 78, 80 are coupled end-to-end in a series. The series extends longitudinally above the seating area 38 and between two light sources 74 and runs adjacent and parallel to the segmented lamp housing 52.

As is shown in FIG. 3, the three elongated light pipes include a forward pipe 76 supported within the forward face panel 44, a center pipe 78 supported within the center face panel 48 and an aft pipe 80 supported within the aft face panel 46. The forward 76 and aft 80 pipes receive light at one end, transmit the light along their lengths and longitudinally emit it from their other ends while laterally emitting it from along their lengths into the passenger compartment 24. The center pipe 78 receives light at both ends from the forward 76 and aft 80 pipes and laterally emits it from along its length into the passenger compartment 24.

In the embodiment of FIGS. 32 and 33, the center pipe 78 is separated generally in half into first and second elongated center light pipe sections 78$k$A, 78$k$B. The center light pipe sections 78$k$A, 78$k$B each have an input end optically coupled to one of the two receptacles 89$k$ A, 89$k$ B of the dual-port light source 74$k$. From the dual-port light source 74$k$ the two center light pipe sections 78$k$A, 78$k$B extend in opposite directions above the seating area adjacent the lamp housing.

Figure 15:
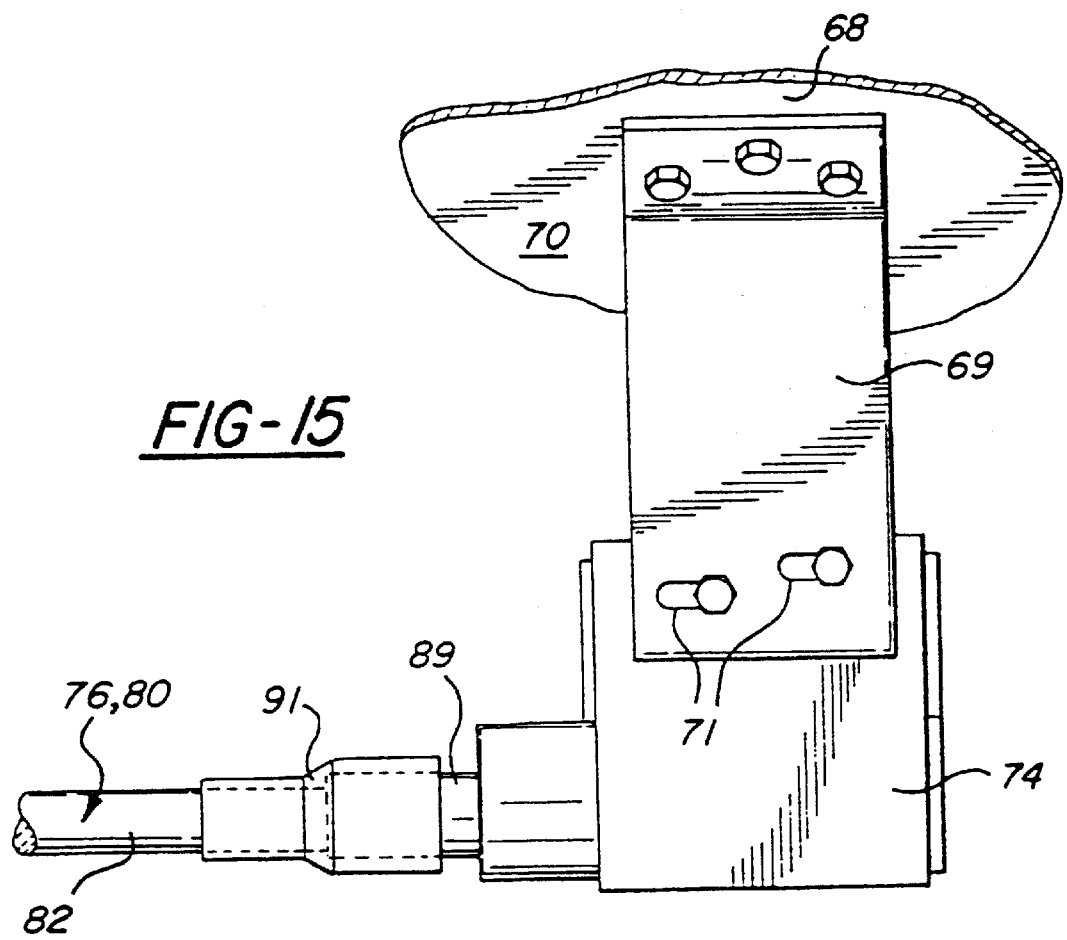
FIG. 15 is a front view of the light engine shown in FIG. 4.

When installing the lighting system 20 the light sources 74 are installed before the light pipes 76, 78, 80. Because the forward 76 and aft 80 pipes must be inserted into the cylindrical receptacles 89 in the light sources 74, the light sources 74 must be moved out of the way when the forward 76 and aft 80 pipes are installed. To facilitate light source 74 movement, each light source 74 is supported within the air duct 68 by a mounting bracket 69 that includes elongated mounting holes 71. As shown in FIG. 15, the elongated mounting holes 71 allow the light sources 74 to be slid away from the light pipes 76, 80. After the light pipes 76, 78, 80 are installed, the light sources 74 are slid back inward to engage and optically couple with the forward 76 and aft 80 pipes. Alternatively, the light sources 74 may be pre-mounted to the light pipes and fastened into place after the light pipes 76, 78, 80 are installed.

As shown in FIG. 3, the forward 76 and aft 80 light pipes have each have an input end 82 and an output end 84. The center light pipe 78 has a forward input end 86 and an aft input end 88. Each of the input ends 82 of the forward 76 and aft 80 light pipes is optically coupled to one of the two light sources 74. The cylindrical receptacles 89 in the light sources 74 receive the input ends 82. As shown in FIG. 15, heat-shrink tubing 91 may be used to secure the input ends 82 in the receptacles 89.

The output ends 84 of the forward 76 and aft 80 light pipes are optically coupled to the forward 86 and aft 88 input ends of the center light pipe 78, respectively. The optical couplings between the light pipes 76, 78, 80 allow the forward 76 and aft 80 light pipes to transmit light from the light sources 74 into the center light pipe 78.

Each elongated light pipe 76, 78, 80 is a solid-core semi-rigid fiber optic. The core section of each pipe 76, 78, 80 is made of a soft acrylic. However, other embodiments may use other light-transmissive materials instead of soft-cored semi-rigid optics, e.g., Dupont Lucite® rods having circular cross-sections and diameters of approximately ⅝ of an inch.

Figure 11:
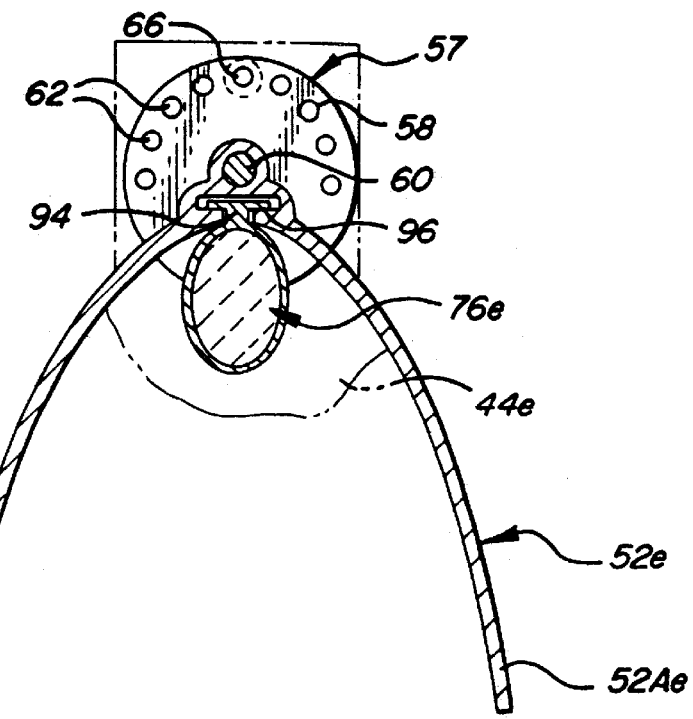
FIG. 11 is a cross-sectional end view of an alternative lamp housing, light pipe and indexing plate.

The core of each light pipe 76, 78, 80 is encased in a cladding having an index of refraction which causes the cladding to emit light laterally. The cladding is made of Teflon®. However, in other embodiments, the cladding may be made of other materials with similar light dispersing characteristics. A clear, semi-rigid jacket surrounds the cladding to reflect a pre-determined portion of the laterally-emitted light back into the core. As is best shown in FIG. 11, each pipe 76, 78, 80 has an oval cross section oriented to optimally concentrate the lateral emission of light.

A light pipe of the type described above is commonly referred to as an "optic." Optics that include cladding to disperse light laterally are commonly referred to as "side-light" or "side-fire" optics. This type of optical pipe is described in U.S. Pat. No. 4,957,347 granted Sep. 18, 1990 to Zarian, incorporated herein by reference. Side-light optical pipes are available from Lumenyte Corporation.

To provide controlled distribution of light, each pipe 76, 78, 80 also includes angled cuts 90 disposed along its length as shown in FIG. 10. The cuts 90 create discontinuities in the pipes 76, 78, 80 that increase the amount of light emitted laterally. The cuts 90 have depths, angles & spacing optimized for even light distribution from along the length of each pipe 76, 78, 80. Side-light optical pipes with cuts or interruptions fabricated into the optic are available from Lumenyte Corporation under the trade name LUMENYTE® STARBURST™ OPTIC.

Figure 14:
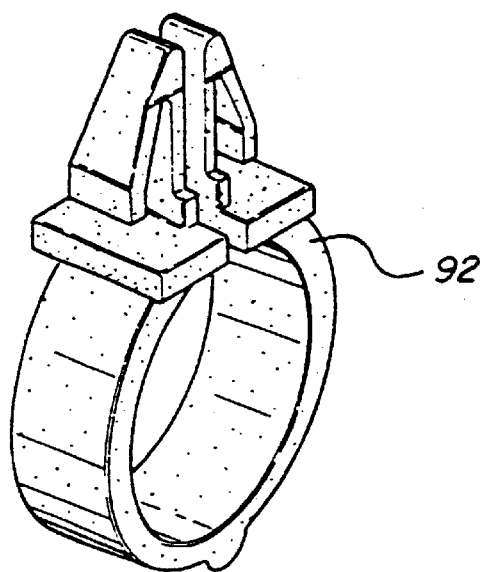
FIG. 14 is a perspective view of a light pipe mounting clip constructed according to the invention.

A plurality of mounting clips or hanger devices, shown at 92 in FIGS. 4, 5, 6, 7 and 14, extend from the lamp housing 52 to support the light pipes 76, 78, 80 at spaced locations along their lengths and to hold the pipes 76, 78, 80 a predetermined distance from the inner reflective concave surface of the lamp housing 52. As is best shown in FIG. 14, the mounting clips are split-ring force-fit snap-engagement mounting clips. Other embodiments may use other means to support the light pipes 76, 78, 80 such as wire or plastic slings.

Figure 8:
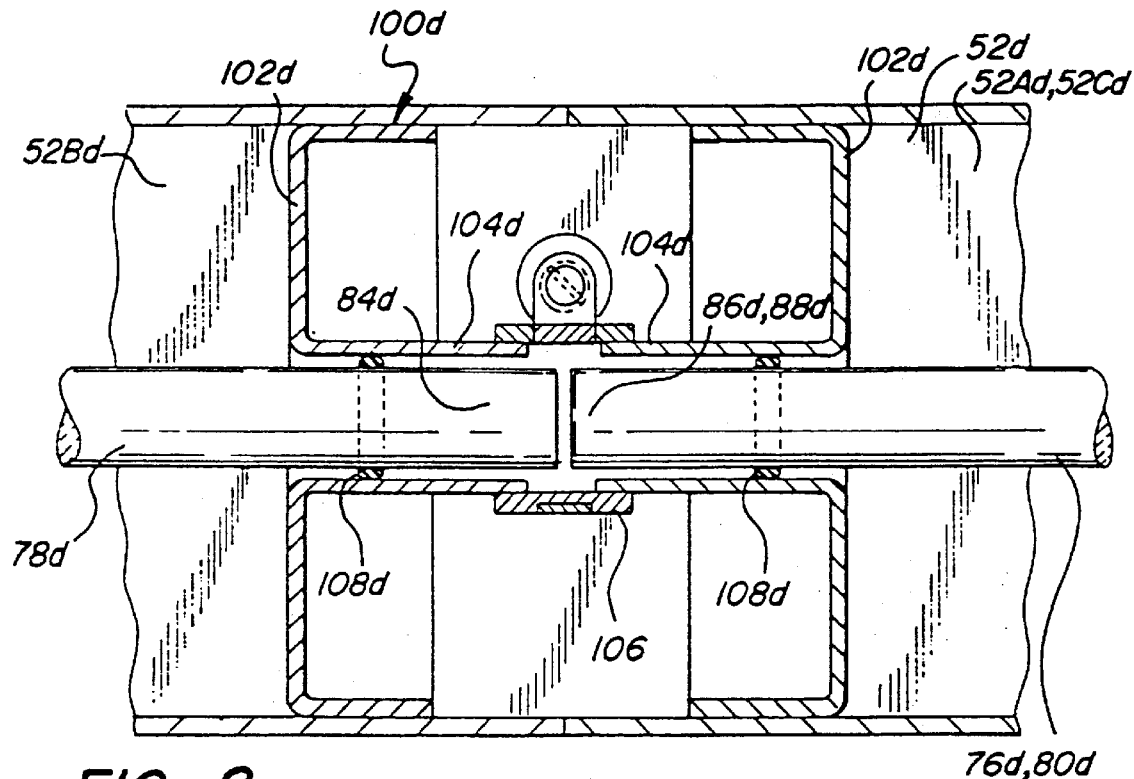
FIG. 8 is a fragmentary cross-sectional bottom view of an alternative coupling means constructed in accordance with this invention.
Figure 9:
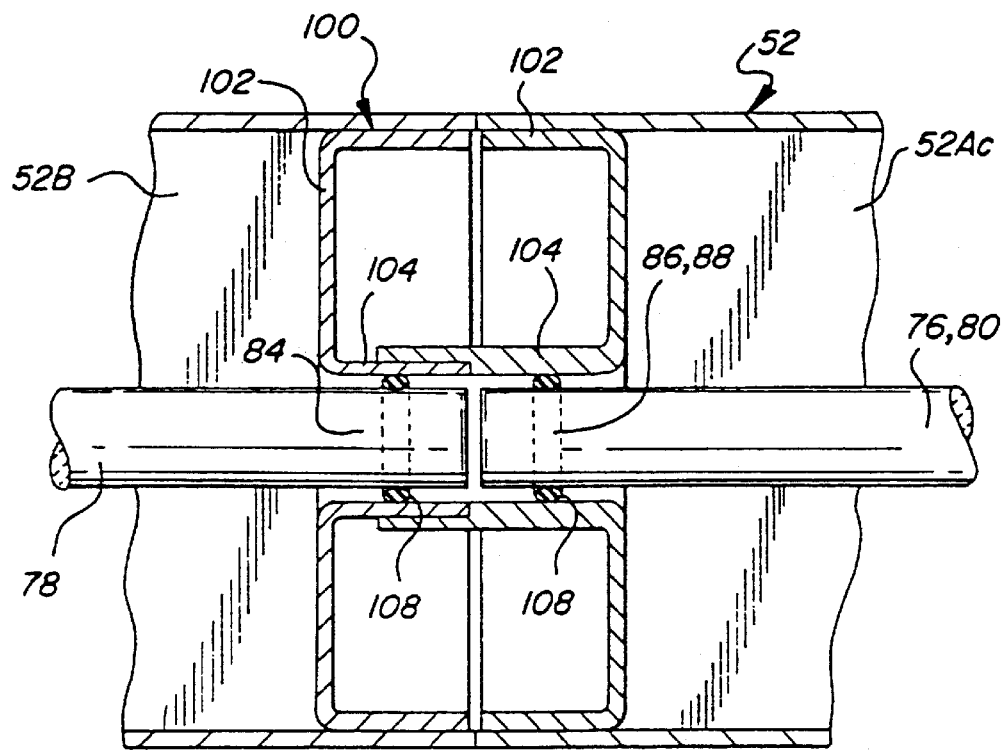
FIG. 9 is a fragmentary cross-sectional bottom view of a coupling means constructed in accordance with this invention.

The light fixture 42 also includes an elongated translucent segmented fluted lens, shown at 98 in FIGS. 1, 2, 4, 5, 6 and 7. Each of five fluted lens segments 98A, 98B, 98C is formed as a U-shaped channel. The lens segments 98A, 98B, 98C, 98D, 98D' are each supported on one of the face panels 44, 46, 48, 50, 50' between a light pipe 76, 78, 80 and the seating area 38. Each lens segment 98A, 98B, 98C, 98D, 98D' brackets and covers a U-shaped lamp housing segment 52A, 52B, 52C to form an enclosed elongated light pipe housing segment with open ends. As shown in FIGS. 8 and 9, end fittings 102 are installed in the open ends of each pipe housing segment. The end fittings 102 include holes to allow light pipe passage as is described in detail below. A forward lens segment 98A covers the forward lamp housing segment 52A, a center lens segment 98B covers the center lamp housing segment 52B, an aft lens segment 98C cover the aft lamp housing segment 52C a forward access lens segment 98D covers the forward access lamp housing segment and an aft access lens segment 98D' covers the aft access lamp housing segment. When the face panels 44, 46, 48, 50, 50' are installed and connected together, the pipe housing segments are aligned and joined together into a single dust-resistant light pipe housing that runs the length of the passenger compartment 24.

Two coupler means, generally indicated at 100 in FIGS. 8 and 9, are supported at spaced locations along the lamp housing 52 and within the segmented pipe housing to slidably support the optically coupled ends 84, 86, 88 of the light pipes 76, 78, 80. One coupler means 100 is disposed at each location where two light pipe ends 84, 86, 88 are optically coupled. Therefore, each coupler means 100 slidably supports two optically-coupled light pipe ends 84, 86, 88 and maintains them in longitudinal optical alignment. Each coupler means 100 facilitates optical light transmission between the light pipes 76, 78, 80 while allowing the light pipes 76, 78, 80 to expand and contract longitudinally.

As shown in FIG. 9, each coupler means includes two face panel end fittings 102. Each face panel end fitting 102 is fixed at the end of a pipe housing section between a lamp housing segment 52A, 52B, 52C and its attached lens segment 98A, 98B, 98C. The end fittings 102 are shaped to fit into the cross-sectional area between the lamp housing 52 and fluted lens 98. The end fittings 102 may be fixed in place by glue or any other suitable fastening means.

A tubular receptacle 104 extends longitudinally through each face panel end fitting 102. The tubular receptacles 104 are shaped to receive the ends 84, 86, 88 of the light pipes 76, 78, 80. As shown in FIG. 9, each end fitting 102 includes either a male or a female tubular receptacle 104 to allow adjacent lamp housing segments 52A, 52B, 52C to slide together and telescopically interconnect.

An o-ring seal 108 is seated within each tubular receptacle 104.

Each o-ring seal 108 slidably and sealingly encircles one of the optically-coupled light pipe ends 84, 86, 88. The seals 108 keep the space between the optically-coupled light pipes 76, 78, 80 free of dust, insects and other contaminants that would otherwise inhibit light transmission.

Second, third, fourth, and fifth embodiments of the lighting system are generally indicated at 20a, 20b, 20c, and 20f in FIGS. 5, 6, 7 and 16 respectively. Reference numerals with the suffix "a" in FIG. 5, "b" in FIG. 6, "c" in FIG. 7 and "f" in FIG. 16 designate alternative configurations of each element common to the first embodiment described above. Unless otherwise indicated, we intend the description of elements in the first embodiment to apply equally to elements in the second, third, fourth and fifth embodiments that carry the same reference numerals, but with suffixes "a", "b", "c" or "f".

The second embodiment of the invention includes a plurality of elongated air duct extension panels, generally indicated at 114 in FIG. 5. The extension panels 114 space the face panels 44a, 46a,48a,50a,50a' farther from the passenger compartment side walls 26a to increase the cross-sectional area of the air duct 68a they enclose. As with the face panels, each extension panel 114 is made as a pultrusion from opaque resin and glass fibers to have an elongated shape of a uniform cross-section along its length.

Each extension panel 114 has an elongated groove 118 extending along its outer edge. Where, as in FIG. 5, a vehicle duct panel 70 is installed in the cornice area of the vehicle 22, the elongated groove 118 of each extension panel 114 engages an elongated duct receptacle 116 formed along the lower edge of the vehicle duct panel 70. In applications where no vehicle duct panel 70 is installed, the outer edge fastens or hooks into a side wall receptacle located just above the side windows 34.

An elongated, upwardly-curved roll-in hook 120 is formed along the inner edge of each extension panel 114. An elongated vertical fin 122 extends upward from along the inner edge of each extension panel 114 adjacent the hook 120. A support strap 124 connects to each vertical fin 122 and extends upward to connect to the vehicle duct panel 70 or vehicle ceiling 40.

An elongated angled fin 126 extends upwardly and outwardly from along the inner edge of each extension panel 114 adjacent the hook 120. Each angled fin 126 runs parallel to each corresponding vertical fin 122 defining a wiring harness raceway 128.

Figure 13:
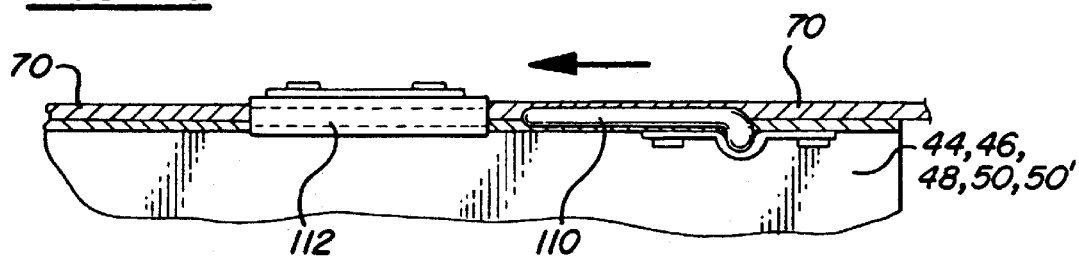
FIG. 13 is a detail view of the light fixture mounting pin and socket.

The face panels 44a, 46a, 48a, 50a, 50'a in the second embodiment are identical to those in the first embodiment, but are installed differently. To install each face panel 44, 46, 48, 50, 50' according to the second embodiment, an installer first installs the air duct extension panels 114. The installer then hooks the downwardly-curved roll-in hook 73 of each face panel 44, 46, 48, 50, 50' over the upwardly-curved roll-in hook 120 of each duct extension panel 114. In this way, each face panel pivotally engages the inner edge of a duct extension panel 114. The installer then pivots each face panel 44, 46, 48, 50, 50' upward until its top edge contacts the upper edge of the vehicle duct panel 70. As shown in FIGS. 5 and 13, cylindrical sockets 112 are attached along the upper edge of the vehicle duct panel 70. As is also shown in FIGS. 5 and 13, at least one latch in the form of a mounting pin 110 is attached to the upper edge of each panel 44, 46, 48, 50, 50' so as to align axially with the cylindrical sockets 112 when each panel 44, 46, 48, 50, 50' is pivoted upward into contact with the vehicle duct panel 70. After pivoting each individual panel upwards, the installer slides each panel 44, 46, 48, 50, 50' laterally so that each of the mounting pins 110 slide into one of the cylindrical sockets 112. The latch need not be in the form of a mounting pin 110, but may be of any configuration that allows an installer to laterally slide each panel 44, 46, 48, 50, 50' into engagement with the vehicle duct panel 70.

Figure 6:
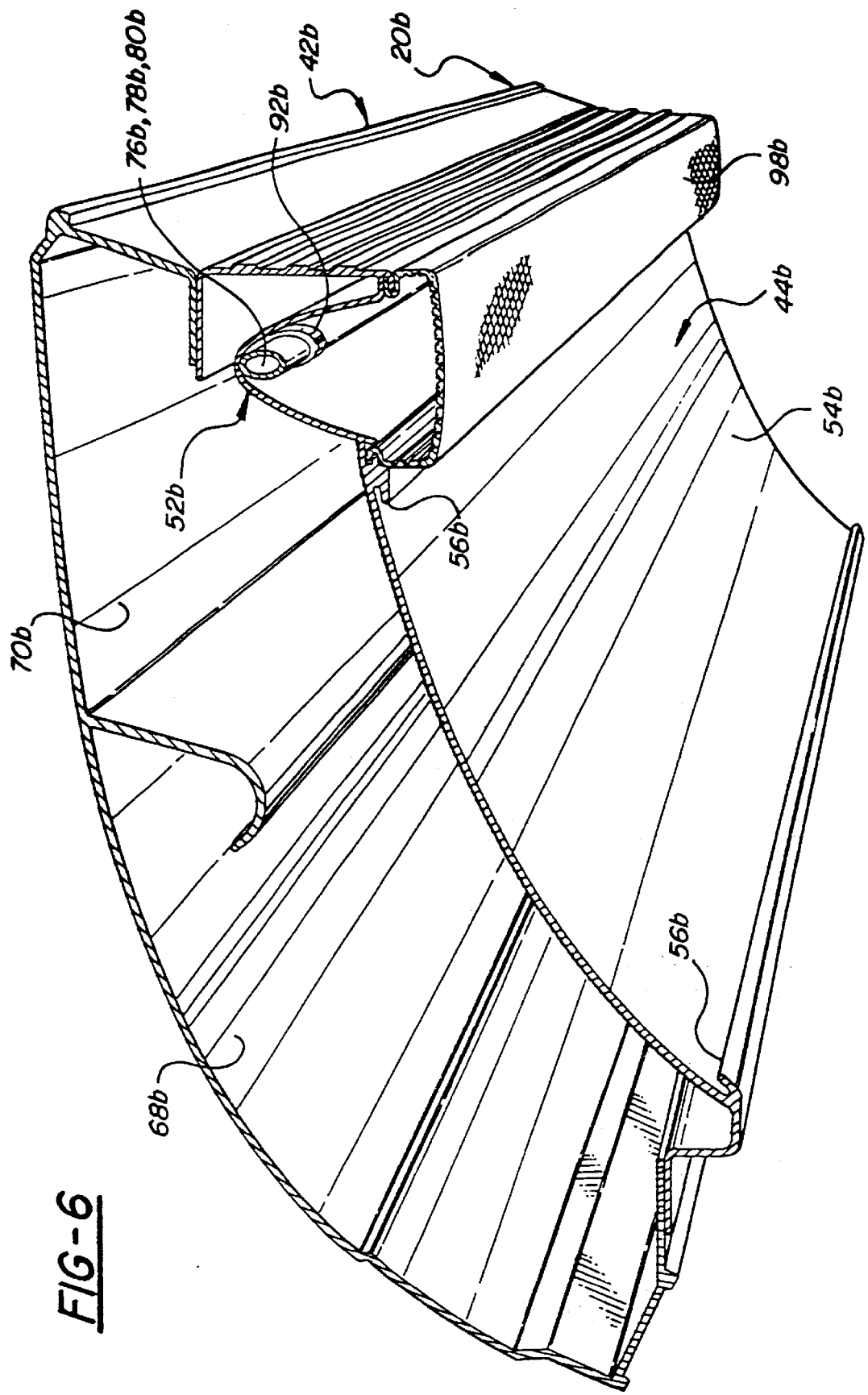
FIG. 6 is a perspective view of a third light fixture embodiment constructed in accordance with this invention.

The third embodiment of the lighting system 20 shown at 20b in FIG. 6 includes a segmented lamp housing 52b disposed along the top edge of each display panel 54b. The fourth embodiment of the lighting system 20 shown at 20c in FIG. 7 includes a lamp housing 52c' disposed along both the top and bottom edges of each display panel 54c.

The fourth embodiment shown in FIG. 7 uses four light sources 74c instead of two. In this embodiment, two of the four light sources 74c are mounted adjacent the forward bulkhead 28 and the other two light sources 74c are mounted adjacent the aft bulkhead 30.

Figure 12:
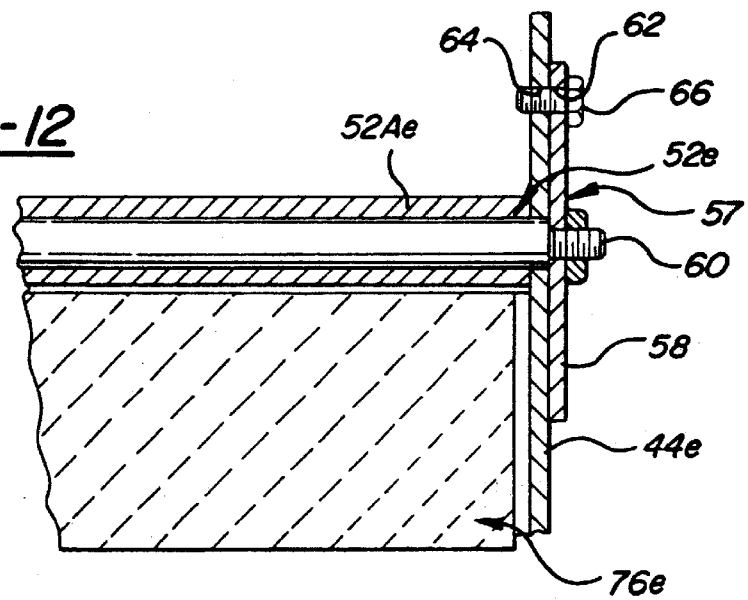
FIG. 12 is a partial cross-sectional side view of the alternative lamp housing, light pipe and indexing plate.

FIGS. 11 and 12 depict an alternative embodiment of the face panels 44, 46, 48, 50, 50' and the segmented lamp housing 52 at 44e, and 52e, respectively. Reference numerals with the suffix "e" in FIGS. 11 and 12 designate the alternative configuration of each element common to the first embodiment. Unless indicated otherwise, where reference numerals appear in the description of the first embodiment without a suffix, we intend the description to apply equally to elements in FIGS. 11 and 12 indicated by the same reference numeral, but with the suffix "e".

FIGS. 11 and 12 depict an alternative segmented lamp housing 52e with three lamp housing segments representatively indicated at 52Ae. The lamp housing segments are formed separately and attached to their corresponding face panels, representatively indicated at 44. FIGS. 11 and 12 show one end of a single exemplary lamp housing segment 52e. Each lamp housing segment 52e is supported in one of the face panels 44e to pivot about a longitudinal axis. An indexing means 57 is operatively connected between each lamp housing segment 52Ae and the face panel 44e it is mounted on. The indexing means 57 allows an installer to incrementally adjust the direction that each lamp housing segment 52Ae will reflect light into the passenger compartment 24.

The indexing means 57 includes an indexing plate 58 that is fixed to one or both ends of each lamp housing segment 52Ae and pivots with each lamp housing segment 52Ae on a pivot pin 60. The pivot pin 60 extends inward from the face panel 44e. The indexing plate 58 includes a plurality of plate holes 62 and the face panel 44e includes a single indexing hole 64 radially aligned with the plate holes 62 about the pivot pin 60. An indexing pin 66 or bolt is insertable through the indexing hole 64 and any one of the plate holes 62. To change the pivotal position of a lamp housing segment 52Ae, an installer need only remove the indexing pin 66, rotate the lamp housing segment 52Ae and indexing plate 58 until a different plate hole 62 aligns with the indexing hole 64, then insert the indexing pin 66 to lock the indexing plate 58 and lamp housing segment 52Ae against pivoting relative to its associated face panel 44e.

Also in FIG. 11, an alternative structure for supporting the light pipes is representatively shown relative to segment 52Ae of the segmented lamp housing 52e and light pipe segment 76e. Instead of using the split-ring clips for support, light pipe segment 76e includes an elongated mounting fin 94 that integrally and laterally extends from along the length of the light pipe segment 76e. The mounting fins 94 each engage an elongated lamp-support panel 95 centrally disposed along the lamp housing segment 52Ae. Because the mounting fins 94 extend toward the lamp housing segment 52Ae, they are able to support light pipe segment 76e without interrupting lateral light emissions from the light pipe segment 76e into the seating area 38. The mounting fin 94 and its respective light pipe segment 76e are formed as a single unitary piece.

The mounting fin 94 has a uniform cross section along its length and includes an elongated stem 182 that extends radially outward from along the length of the light pipe segment 76e. The stem 182 has a uniform width extending between first and second parallel opposite sides. First and second elongated fin engagement surfaces 184, 186 extend laterally outward from along the respective first and second sides of the stem 182. The fin engagement surfaces 184, 186 run longitudinally parallel to the light pipe segment 76e.

To accommodate the fin 94, the lamp-support panel portion 95 comprises first and second elongated panel engagement surfaces 188, 190. The panel engagement surfaces 188, 190 are disposed in a coplanar spaced-apart parallel relationship to form an elongated slot 200 longitudinally disposed along the lamp-support panel portion 95. The slot 200 has a uniform slot width slightly greater than the fin stem width. The panel engagement surfaces 188, 190 face away from the light pipe segment 76e and engage the fin engagement surfaces 184, 186 in a parallel and flush disposition along their respective lengths. This arrangement supports each light pipe segment 76e in an optimal position to direct light into the passenger seating area 38.

In other embodiments, there may be only one rather than two engagement surfaces. The engagement surfaces 184, 186 may be disposed on one or more nubs or other such protrusions extending laterally outward from along the length of the stem 182. The engagement surfaces may alternatively be disposed on one or more depressions formed into the stem 182. The protrusions and depressions may be of any shape capable of supporting the light pipe segment 76e by engaging corresponding engagement surfaces 188, 190 in the lamp-support panel 95.

The fin 94 may have a T-shaped cross-section, as representatively shown in FIG. 11 in relation to lamp housing segment 52Ae and light pipe segment 76e. The T-shaped cross section of the fin 94 allows the fin to slide longitudinally into an elongated longitudinally-extending T-shaped channel 96 formed into the concave inner surface of the lamp-support panel portion 95 of the lamp housing segment 52Ae. The T arrangement is primarily intended for mounting multiple, relatively-short, optically-coupled light pipe segments in lamp segments. Fins on longer light pipe segments would be difficult to slide into such channels 96 due to the amount of friction that would generally be caused when a relatively large amount of fin engagement surface area would contact a relatively large amount of panel engagement surface area.

In practice, the light pipe mounting fin 94 of FIG. 11 is slid end-first and lengthwise into an installed position in the elongated slot 96 with the fin stem 182 disposed between the first 188 and second 190 panel engagement surfaces. In the installed position, the fin engagement surfaces 184, 186 are disposed above the panel engagement surfaces 188, 190 and the light pipe segment 76*e* is suspended below the slot 200. Lamp housing segment 52A*e* of fixture 42*e* is then installed in a longitudinal disposition in the vehicle passenger compartment 24 above the seating area 38 and the light pipe section 76*e* is optically coupled to the light source 74. Alternatively, the light fixture 42*e* may be installed before inserting the light pipe mounting fin 94.

Rather than having a T-shaped cross-section, the fin may have a "Christmas tree"-shaped cross-section, as representatively shown at 94' in FIGS. 22 and 23 in relation to lamp housing segment 52A' and light pipe segment 76'. This type of fin 94' is designed to "snap-in" rather than "slide-in" to the slot 200' in a lamp-support panel portion 95' of the lamp housing segment 52A'. This "snap-in" version of the fin 94' includes an elongated apex 202 disposed along the top edge of the stem 182'. A plurality of elongated ramp surfaces 204, 206 taper outward and downward from along the apex 202 and the stem 182' to an outer edge of each of a plurality of fin engagement surfaces 184', 186', forming a plurality of elongated barbs 208, 210. The elongated barbs 208, 210 allow the fin 94' to be force-fit into a snap-in-type engagement along its length into the slot 200'. This "snap-in" fin configuration 94' is intended for mounting longer light pipe segments 76', that would encounter significant frictional resistance along their lengths if they were slid end-first into a track 96'. The fin 94' may include only one pair of barbs 208, 210.

In practice, the "snap-in" version of the light pipe mounting fin 94' is forced apex-first rather than end-first into the elongated slot 200'. This causes the elongated barbs 208, 210 to first compress inward against the elongated stem 182' and then to snap back outward after passing through the slot 200' into an installed position as shown in FIG. 25. In the installed position, the fin stem 182' is disposed between the first 188' and second 190' panel engagement surfaces, at least two opposing barbs 208, 210 are disposed above the panel engagement surfaces 188', 190' and the light pipe section 76' is suspended below the slot 200'. The lamp housing section 52A' and light fixture 42' are then installed in a longitudinal disposition in the vehicle passenger compartment 24 above the seating area 38, and the light pipe section 76' is optically coupled to the light source 74. The lamp housing section 52A' and light fixture 42' may, alternatively, be installed prior to inserting the light pipe mounting fin 94' into the slot 200'.

The slide-in or snap-in light pipe installation features may be included in any of the lamp housings in any of the light fixture embodiments described in this specification. Any of the lamp housing embodiments that this specification describes may be modified to include an elongated slot 200 for receiving a light pipe mounting fin 94, 94' in either a slide-in or a snap-in engagement.

Four additional light pipe mounting clip or hanger device embodiments are generally indicated at 220, 220*x*, 220*y*, 220*z* in FIGS. 24–31, respectively. The additional hanger device embodiments are representatively shown relative to segment 52A*e* of the segmented lamp housing 52*e* of light fixture 42, and also relative to light pipe segment 76*e*. Reference numerals with the suffix "x" in FIGS. 25 and 26, the suffix "y" in FIGS. 27 and 28 and the suffix "z" in FIGS. 29–31 designate the alternative configuration of each element common to the embodiment of FIG. 24. Unless the description indicates otherwise, where the description uses a reference numeral to refer to an element in FIG. 24. I intend that portion of the description to apply equally to elements in FIGS. 25–31 indicated by the same reference numeral with the suffix "x", "y" or z respectively.

As with the hanger device 92 shown in FIG. 14, a plurality of the hanger devices 220, 220*x*, 220*y*, 220*z* are used to suspend a light pipe 76*e*. The hanger devices 220, 220*x*, 220*y*, 220*z* are configured to suspend a light pipe 76*e* from a supporting structure such as the lamp-support panel 52A*e* or reflector panel in, for example, the light fixture 42 described above. Each hanger device 220, 220*x*, 220*y*, 220*z* includes a strip or band 222 of resilient material formed to include a lower hoop 224 and a connector comprising an upper probe portion 226.

The lower hoop 224 is configured to wrap around the circumference of the light pipe 76*e* to be suspended. The lower hoop 224 shown in the drawings is semi-circular but may, in other embodiments, be other shapes that may or may not complement various light pipe cross-sectional shapes.

The upper probe portion 226 is configured to fasten the hanger device 220, 220*x*, 220*y*, 220*z* to the lamp-support panel 52A*e*. The upper probe portion 226 is configured to engage one of a plurality of corresponding openings such as hanger receptacles 228 in the lamp-support panel 52A*e*. The upper probe portions 226 thus suspend the remainder of the hanger devices 220, 220*x*, 220*y*, 220*z* and the light pipe 76*e* from the lamp-support panel 52A*e*.

The lower hoop 224 and the upper probe portion 226 of each hanger device 220, 220*x*, 220*y*, 220*z* are formed from metal or plastic as a single unitary piece. When formed from metal the hanger devices 220, 220*x*, 220*y*, 220*z* may each comprise a single strip of spring steel that has been bent to form the lower hoop 224 and upper probe portions 226. When formed from plastic the hanger devices 220, 220*x*, 220*y*, 220*z* may be injection molded. The hanger devices 220, 220*x*, 220*y*, 220*z* may also comprise a plastic material that is at least translucent and that may be transparent. The use of translucent or transparent material reduces the amount of light that the hanger devices 220, 220*x*, 220*y*, 220*z* will block as the light radiates from a side-fire light pipe 76*e* passing through the hanger devices 220, 220*x*, 220*y*, 220*z*.

Each hanger device 220, 220*x*, 220*y*, 220*z* is configured to allow its upper probe portion 226 to compress sufficiently to pass upward through a hanger receptacle 228 and then to spring back toward a relaxed shape or configuration after passing through the hanger receptacle 228. When relaxed, the shape of the probe portion 226 of the connector device allows the probe portion 226 to engage a portion of an upper surface 230 of the lamp-support panel 52A*e* and/or a rim 232 that defines the hanger receptacle 228. The relaxed shape of the probe portion 226 also resists being pulled back downward through the hanger receptacle 228.

In the hanger device 220, 220*x*, 220*y*, 220*z* embodiment shown in FIG. 24 the upper probe portion 226 comprises an arcuate lobe 234. The arcuate lobe 234 and lower hoop 224 together form a closed arcuate band 222 having a peanut-shaped outline. In other words, the band 222 has the general shape of a pair of opposing lobes integrally merging at a pinched region 236. The arcuate lobe 234 is broader than the hanger receptacle 228 in the lamp-support panel 52A*e* but is laterally compressible to a small enough size to fit through the hanger receptacle 228. The lobe 234 may be compressed to this extent by forcing it upward through a hanger receptacle 228. In addition, or as an alternative, the arcuate lobe 234 may be laterally compressed by squeezing the lower hoop 224. Because the lower hoop 224 and arcuate lobe 234 are formed as a single unitary piece or band 222, squeezing or laterally compressing the lower hoop 224 will also cause the arcuate lobe 234 to laterally compress.

In the embodiment shown in FIGS. 25 and 26, the lower hoop 224x includes a circumferential gap 238 configured to receive the light pipe 76e in snap-in engagement. The gapped hoop 224x has an inverted "U" shape with the distal ends of the "U" splayed outward to facilitate light pipe insertion. The gap 238 extends from an approximate four o'clock position to an approximate eight o'clock position of the lower hoop 224x.

As shown in FIGS. 25 and 26 the upper probe portion 226x of this hanger device embodiment 220x comprises a mounting fin generally indicated at 240. The mounting fin 240 includes a stem 242 having a rectangular cross-section and extending integrally upward from the lower hoop 224x of the hanger device 220. The stem 242 is disposable within the hanger receptacle 228 in the lampsupport panel 52Ae.

The mounting fin 240 additionally includes first and second lower engagement surfaces 244 disposed adjacent the stem 242 and on laterally opposite sides of the stem 242. The engagement surfaces 244 are configured to engage the upper surface 230 of the lamp-support panel 52Ae once the mounting fin 240 has been pushed through the hanger receptacle 228 and to thereby suspend the light pipe 76e below the lamp-support panel 52Ae.

The fin 240 also includes an apex that defines a fin upper edge 246.

A pair of ramp surfaces 248 taper outward and downward from the apex 246 to an outer edge of each of the fin engagement surfaces 244 to form the top surfaces of a pair of barbs 250.

The stem 242 is narrower than the hanger receptacle 228 by an amount sufficient to allow the barbs 250 to fit through the hanger receptacle 228 together with the stem 242 by folding downward against the stem 242. The barbs 250 are forced to fold downward against the stem 242 when the barbs 250 are pushed through the hanger receptacle 228. The barbs 250 are sufficiently resilient to spring outward or "deploy" once the fin 240 is through the hanger receptacle 228 and the receptacle rim 232 is no longer constraining the barbs 250. The barbs 250 deploy into a position where the engagement surfaces 244 engage the upper surface 230 of the lamp-support panel 52Ae as shown in FIG. 26. In other words, the barbs 250 are configured so that they cannot easily be drawn back down through the hanger receptacle 228 from the deployed position.

As is representatively shown in FIGS. 25 and 26 for a single hanger device, a plurality of the hanger devices 220x may be used to install a light pipe 76e in a light fixture 42 by first inserting the upper edges 246 of the hanger device fins 240 upward into corresponding ones of the hanger receptacles 228 in the lamp-support panel 52Ae. The fin upper edges 246 are inserted such that the fin ramp surfaces 248 engage the rims 232 that define the hanger receptacles 228 in the lamp-support panel 52Ae. The fins 240 are then forced through the hanger receptacles 228.

As each fin 240 passes through its corresponding hanger receptacle 228, it contacts the rim 232 as shown in FIG. 25. Continued upward motion of the fin 240 through the receptacle 228 then causes the elongated barbs 250 to fold or compress inward against the stem 242 of the fin 240. Once the barbs 250 have passed through the hanger receptacle 228 they spring back outward and spread-out across the hanger receptacle 228 with the fin engagement surfaces 244 resting on the upper surface 230 of the lamp-support panel 52Ae as shown in FIG. 26.

Finally, a light pipe 76e is snapped into the lower hoop 224x of each hanger device 220x by pushing the light pipe 76e sideways through the gap 238 in the lower hoop 224x of each hanger device 220x. As the light pipe 76e passes through each hoop 224x, it causes each hoop 224x to expand. Once the light pipe 76e has passed completely through each hoop 224x, each hoop 224x contracts or "snaps-back" around and grips the light pipe 76e as shown in FIG. 26. Alternatively, the light pipe 76e may be snapped into place through the gaps 238 in the lower hoops 224x of the hanger devices 220x before pushing the fins 240 through the hanger receptacles 228.

In the embodiment shown in FIGS. 27 and 28, opposite ends 252 of the band 222y are drawn together and crossed to form the lower hoop 224y. The upper probe portion 226y comprises opposite terminal lengths or prongs 254 of the band 222y. The prongs 254 extend diagonally upward and outward from a cross point 256 where the two prongs 254 cross each other. Each prong 254 additionally includes an engagement surface 256 that is configured to engage the upper surface 230 of the lamp-support panel 52Ae and/or the rim 232 when the upper probe portion 226y has been moved through the hanger receptacle 228 in the lamp-support panel 52Ae.

As shown in FIG. 28, the band 222y has a relaxed state or configuration in which the prongs 254 are crossed and the distance between the crossed ends 252 of the band 222y is greater than a distance measured across the hanger receptacle 228 between opposing edges of the rim 232. In the relaxed state, the lower hoop 224y has a diameter generally less than or equal to a diameter of the light pipe 76e to be suspended in the hoop 224y. When the diameter of the hoop 224y in the relaxed state is smaller than that of the light pipe 76e, it causes the lower hoop 224y to maintain a constricting force around the light pipe 76e when the light pipe 76e is inserted through the hoop 224y.

As is representatively shown in FIGS. 27 and 28 for a single hanger device 220y, a plurality of the hanger devices 220y may be used to install a light pipe 76e in a light fixture 42 by first expanding the lower hoop 224y of each hanger device 220y such that the upper ends 252 of the probe prongs 254 of each device move close enough together to pass into respective hanger receptacles 228 in the lamp-support panel 52Ae. The upper ends 252 of the probe prongs 254 of each hanger device 220y are then passed through their respective hanger receptacles 228. Once the probe prongs 254 have been pushed completely through their respective hanger receptacles 228, the lower hoops 224y of the hanger devices 220y are allowed to contract back toward the pre-expanded or relaxed position or configuration shown in FIG. 28. In the relaxed configuration shown in FIG. 28, the upper ends 252 of the probe prongs 254 are spread far enough apart to engage opposing sides of the rims 232 defining the hanger receptacles 228 and the lower hoops 224y close around and "grip" the light pipe 76e.

The light pipe 76e may be inserted through the lower hoops 224y either before installing the hanger devices 220y or after installing the hanger devices 220y. In either case, the light pipe 76e is inserted axially through the lower hoops 224y of the hanger devices 220y.

When the probe prongs 254 are inserted into the hanger receptacles 228, they may be inserted only part way through to where the prong ends 252 spread laterally to engage opposite edges of the rim 232 as shown in FIG. 27. With the ends 252 of the probe prongs 254 engaging the rim 232 in this manner, the lower hoop is held in an enlarged state or configuration that allows the light pipe 76e to be easily slid through. Once the light pipe 76e has been inserted through the lower hoops 224y of the hanger devices 220y, the prongs 254 of the probes are pushed the rest of the way through their respective hanger receptacles 228. This allows the prongs 254 to spring outward above the hanger receptacles 228 and allows the lower hoops 224y to correspondingly constrict and "grip" the light pipe 76e.

Figure 29:
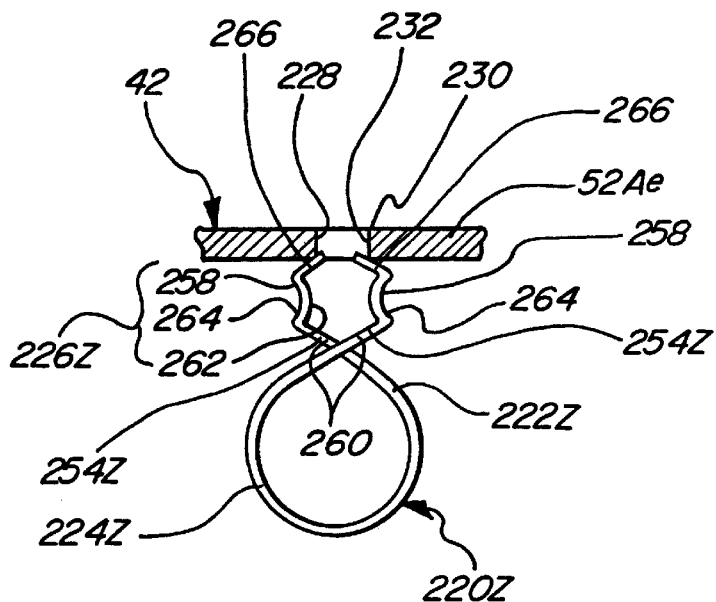
FIG. 29 is an end view of another alternative light pipe mounting clip constructed according to the invention and engaging an opening is a support structure, the support structure being shown in cross-section.
Figure 30:
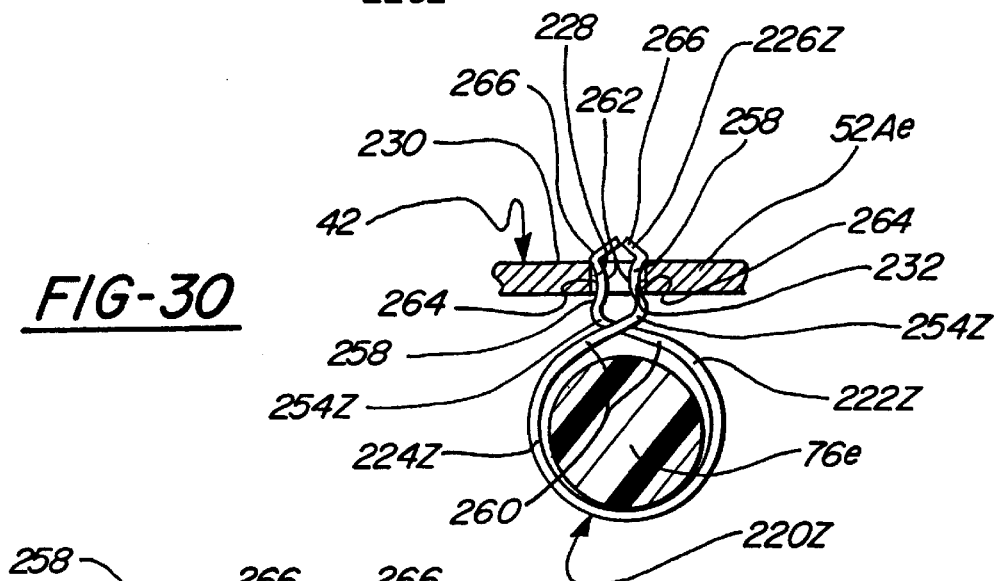
FIG. 30 is an end view of the light pipe mounting clip of FIG. 29 holding a light pipe, a probe portion of the clip extending part-way through the opening in the support structure, the light pipe and support structure being shown in cross-section.
Figure 31:
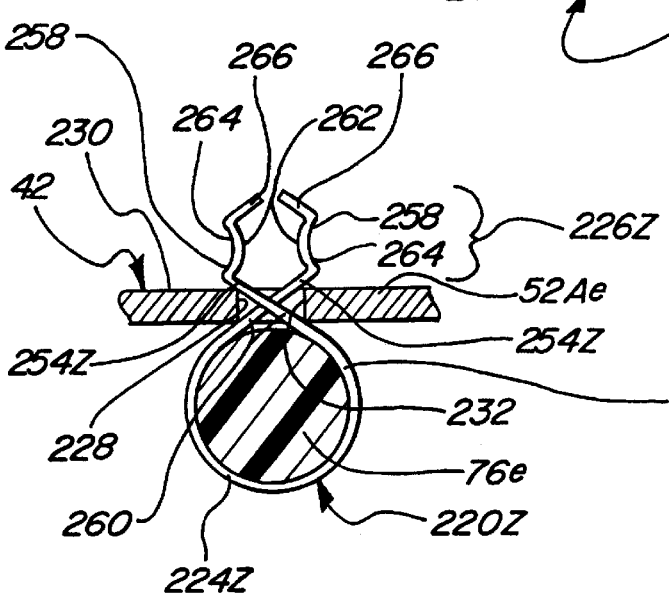
FIG. 31 is an end view of the light pipe mounting clip of FIGS. 29 and 30 suspending the light pipe from the support structure.

In the embodiment shown in FIGS. 29–31, each prong 254z extends diagonally upward and outward from the cross point to a point where it then forms a detent 258. The detent portion 258 of the prong 254z is configured to positively engage opposite edges of the hanger receptacle rim 232 when the upper probe portion 226z has been moved partially through the hanger receptacle 228. The prongs 254z are laterally inwardly compressible to a compressed position or configuration shown in FIG. 30. The compressed position allows the prongs 254z to pass through the hanger receptacle 228.

Each detent 258 comprises a generally vertical intermediate section or portion of one of the prongs 254z. The intermediate section of each prong 254z integrally extends in a generally vertically upward direction from an upper end of a diagonally extending portion 260 of that prong 254z. The intermediate section of each of the prongs 254z is bent or otherwise formed to have a generally arcuate shape. The intermediate sections therefore have respective generally convex or humped surfaces 262 that face inward toward each other and respective generally concave or cupped surfaces 264 that face outward. The outward-facing concave surfaces 264 are configured to engage the opposite edges of the hanger receptacle 228 when the upper probe portion 226z has been moved partially through the hanger receptacle 228.

I intend the word concave, as used in the above paragraph, to describe any configuration that provides an indentation or depression of any shape and depth sufficient to resist upward and downward movement of the hanger device 220z when the outward-facing concave surface of the intermediate prong 254z sections are engaged with the hanger receptacle rim 232. In other embodiments, the detent 258 may have any one of a number of different configurations capable of engaging opposite edges of a hanger receptacle 228 or other opening in a support structure.

Each prong 254z also includes a diagonally inwardly and upwardly extending upper ramp 266 that integrally extends from an upper end of the intermediate portion of the prong 254z. Each upper ramp 266 has an upper engagement surface configured to aid in guiding the upper probe portion 226z into the hanger receptacle 228 when the prongs 254z are moved toward each other. As shown in FIGS. 29 and 30, the upper ramp portion 266 of each prong 254z initially presents a small cross section that easily fits into the hanger receptacle 228 as the hanger device 220z is pushed upward. As the hanger device 220z is advanced further upward the ramp portions 266 of the two prongs 254z slide upward past the rim 232 of the hanger receptacle 228, compressing the prongs 254z laterally toward each other.

As is representatively shown in FIGS. 29–31 for a single hanger device 220z, a plurality of the hanger devices 220z may be used to install a light pipe 76e in a light fixture 42 by first placing the upper engagement surfaces of the ramp portions 266 of each of the prongs 254z in contact with opposing sides of a rim 232 defining a corresponding hanger receptacle 228 in the lamp-support panel 52Ae. Each hanger device 220z is then pushed upward causing the prongs 254z to move inward toward each other as they slide upward along opposing sides of the rim 232. Each hanger device 220z is then pushed further upward until the detent portions 258 of the prongs 254z engage opposing sides of the corresponding rim 232 and the lower hoop 224z is expanded sufficiently to receive the light pipe 76e.

The light pipe 76e is then axially inserted through the expanded lower hoops 224z of the hanger devices 220z. With the light pipe 76e suspended in the lower hoops 224z, the hanger devices 220z are then pushed farther upward until the detent portions 258 of the prongs 254z of each hanger device 220z disengage from the respective rims 232, move upward through the respective hanger receptacles 228 and splay upward and outward over the lamp-support panel 52Ae as the lower hoops 224z close inward around the light pipe 76e.

An alternative coupler means is shown at 100d in FIG. 8. Reference numerals with the suffix "d" in FIG. 8 designate the alternative configuration of each element common to the first embodiment. Unless indicated otherwise, where the description of the first embodiment refers to an element with a reference numeral having no suffix, we intend the description to apply equally to elements in FIG. 8 indicated by the same reference numeral, but with the suffix "d".

In the alternative embodiment depicted in FIG. 8, the coupling means 100d includes a cylindrical clamp member 106. The clamp member 106 surrounds the tubular receptacles 104d of adjacent end fittings 102d and binds them end-to-end. In this alternative embodiment, the end fittings 102d are identical to one another and the tubular receptacles 104d are longer than in the first embodiment.

The fifth embodiment of the invention includes a plurality of light fixtures of like construction which are representatively illustrated by the single light fixture generally indicated at 42f in FIG. 16. The lighting fixture 20f of the fifth embodiment is similar in most respects to that of the second embodiment described above with several exceptions, e.g., the fifth embodiment is adapted to accommodate either fluorescent lamps or fiber optic light pipes.

The representative lighting fixture 20f is mounted in the cornice area of the vehicle above the seating area 38 and includes a representative face panel, generally indicated at 44f in FIG. 16. The face panel 44f includes an upper edge 130 adapted to connect to the vehicle ceiling 40. As with the second embodiment, the light fixture 42f encloses and defines a portion of an elongated air duct 68f and includes an air duct extension panel, generally indicated at 1 14f in FIG. 16. The air duct extension panel 114f is adapted to mount between the vehicle side wall 26f and the face panel 42f to space the face panel 42f from the side wall 26f. The air duct extension panel 114f has an inner edge 132 adapted to connect to a lower edge 136 of the face panel 42f, and an outer edge 134 adapted to connect to the vehicle side wall 26f.

The face panel 42f and duct extension panel 114f are each pultruded as unitary members from resin and glass fibers so as to have elongated shapes with uniform cross sections along their respective lengths. A lamp housing, generally indicated at 52f in FIG. 16, is integrally formed as a unitary piece with the face panel 42f and is disposed adjacent and generally parallel to the face panel lower edge 136.

The lamp housing 52f includes an elongated concave portion 138 that opens in the direction that the fixture will provide light to the seating area 38. The lamp housing 52f is disposed adjacent and generally parallel to the face panel lower edge 136 and the duct extension panel inner edge 132. This allows the lamp housing 52f to project light from a position spaced laterally from the side windows 34f and vertically from the ceiling 40. Because the lamp housing 52f is spaced from the windows 34f, its position minimizes side window illumination and reflective glare. Because the lamp housing 52f is spaced from the ceiling 40, its position is closer to the seating area 38 thus maximizing seating area illumination and reducing the amount of light dispersed into the aisle 36 and other portions of the passenger compartment 24.

A male pivotal connector member 73f is disposed along the face panel lower edge 136. The male pivotal connector member 73f pivotally connects the face panel 42f to the air duct extension panel 114f. A female pivotal connector member 120f is disposed along the duct extension panel inner edge 132. The female pivotal connector member 120f receives the male pivotal connector member 73f in a "roll-in"-type engagement.

A suspension member 124f provides support for the duct extension panel 114f from the vehicle ceiling 40 or other overhead structures. The suspension member 124f has a lower end that connects to the duct extension panel 114f adjacent the inner edge 132, and an upper end that connects to the vehicle ceiling 40 or structures attached to the ceiling 40.

An elongated lens, generally indicated at 98f in FIG. 16, is supported between the lamp housing 52f and the seating area 38. The lens 98f is formed as a U-shaped channel with first and second laterally opposite lens edges. The first lens edge includes a "roll-in"-type male lens connector member 140. The male lens connector member 140 pivotally mounts the lens 98f to the face panel 42f adjacent the first of two laterally opposite lamp housing edges that border the elongated concave portion 138 of the lamp housing 52f. A female lens connector member, shown at 142 in FIGS. 16–20, is integrally formed in the face panel 42f adjacent the first lamp housing edge. The female pivotal lens-connector member 142 includes a receptacle 144 that receives the male lens connector member 140 in a "roll-in"-type engagement.

A catch 146 is disposed along the second lens edge and has the shape of a laterally-elongated prong. A corresponding detent 148 is integrally formed in the face panel 42f adjacent the second housing edge and receives the catch 146 in a "snap-fit"-type engagement. This allows the lens 98f to be snapped into a closed position over the lamp housing concave portion 138.

The "roll-in" lens connector members 140, 142 and "snap-fit" catch 146 and detent 148 arrangement help prevent dust from entering the lamp housing 52f The male lens connector member 140 has the shape of a laterally-elongated hook. Moreover, the snap connection between the catch 146 and the detent 148 is dust-resistant. The "roll-in" lens connector members 140, 142 and "snap-fit" catch 146 and detent 148 arrangement help prevent dust from entering the lamp housing 52f along either of the laterally opposite lens edges. A line-contact may be formed between the lens connector members 140, 142 to further reduce dust intrusion. The line contact may be provided along a line where the lip of the female pivotal lens-connector member 142 contacts the male connector member 140. Alternatively, the line contact may be provided along a line where the lip of the male connector member 140 contacts the female connector member 142.

An upper advertising card holder 152, comprising a grooved border, extends integrally outward from the face panel 42f. The upper advertising card holder 152 lies adjacent and parallel to the face panel upper edge 130. A lower advertising card holder 154 similarly includes a grooved border that lies adjacent and parallel to the face panel lower edge 136 and in opposition to the grooved border of the upper advertising card holder 152. The upper 152 and lower 154 advertising card holders are positioned to hold an advertising card between them.

An upper mounting flange 156 is formed adjacent the face panel upper edge 130. The mounting flange 156 includes fastener openings that receive fasteners to connect the face panel 42f to the ceiling 40. The fastener openings are located between the upper 152 and lower 154 advertising card holders so that a card installed between the advertising card holders 152, 154 will cover the fastener openings 158 and provide a more aesthetically-pleasing appearance. As shown in FIG. 16, the mounting flange 156 is formed into a channel shape with a triangular cross-section. The mounting flange 156, or mounting "channel", has a channel lower wall 160 that lies flush with the face panel 42f and a channel upper wall 162 designed to contact the vehicle ceiling 40. The mounting channel 156 includes two types of fastener openings: a series of spaced interior fastener holes 164 and an exterior fastener access slot 166. The fastener access slot 166 extends through the mounting channel lower wall 160 and provides tool and fastener access to the mounting channel interior. The interior fastener holes 164 extend through the mounting channel upper wall 162 and receive and engage the fasteners as they are installed through the mounting channel 156 and into the vehicle ceiling 40.

For vehicle applications that do not use advertising cards, a plug strip may be provided to fill the fastener slot 166. The plug strip 168 may be snap-fit, glued in place or fastened by any other suitable method.

The face panel 42f has a panel back surface and the lamp housing 52f has a housing back surface that each face upward toward the vehicle ceiling 40 following installation. A first elongated retainer tab 170 integrally extends longitudinally along the entire length of the lamp housing 52f and laterally from the housing back surface toward the panel back surface. A second elongated retainer tab 172 integrally extends longitudinally along the entire length of the face panel 42f and laterally from the panel back surface toward the first retainer tab 170. The first 170 and second 172 retainer tabs cooperate with the lamp housing 52f and face panel 42f back surfaces to partially enclose and define a wiring harness raceway 174. The retainer tabs 170, 172 laterally extend toward one another leaving a longitudinal slot that runs between them along their entire lengths. The slot provides an elongated access opening for an installer to push wires or wire bundles through and into the raceway as shown at 180 in FIG. 16.

The fixture includes at least one end cap, generally indicated at 176 in FIG. 16, mounted within the lamp housing concave portion 138. The end cap 176 has peripheral edges that engage the lamp housing concave portion 138 and the light cover. The end cap 176 also includes a through-hole 178 shaped to receive a fluorescent bulb socket.

Possible variations on the fifth embodiment of the present invention include a light fixture 42f with a female lens roll-in connector member 142 that is integrally formed in a portion of the lamp housing 52f rather than the face panel 44f so that the male lens connector member 140 may mount to a portion of the lamp housing 52*f* adjacent and parallel to the first lamp housing edge instead of to the face panel 44*f*. Also, the "snap-in" lens attachment detent 148 may be integrally formed in or attached to the lamp housing 52*f* rather than the face panel 44*f*.

In another possible variation on the fifth embodiment, the end cap 176 may include a through-hole shaped to receive a light pipe rather than a fluorescent bulb socket. Where light pipes are optically-coupled to one another and are supported end-to-end through a series of adjacent lighting fixtures, the end cap 176 may also comprise a portion of a coupler adapted to slidably support the optically-coupled ends of two adjacent light pipes. Examples of couplers of this type are shown at 100*d* and 100 in FIGS. 8 and 9, respectively. To support the light pipe at spaced locations along its length, a plurality of mounting clips or holes for receiving mounting clips may be included in the lamp housing 52*f* An example of such a mounting clip is shown at 92 in FIG. 14.

In another variation on the fifth embodiment, the face panel 44*f* is modified for use without a duct extension panel 114*f*. For attachment directly to a vehicle side wall 26*f* or other associated structures, the face panel 44*f* may be modified at its lower edge as shown at 136*g*, 136*h*, 136*i* in FIGS. 17, 18 and 19, respectively. The upper edge 130 may also be modified as shown in FIG. 18. FIGS. 17, 18 and 19 show different upper 130 and lower 136 edge configurations suited to particular vehicle applications. Other combinations of the upper 130 and lower 136 edges shown in FIGS. 16, 17, 18, 19 may be used to adapt a face panel 44 to fit various vehicle interior configurations. For example, the upper edge 130*h* shown in FIG. 18 may be included on the face panel 44*f* of FIG. 16.

Figure 21:
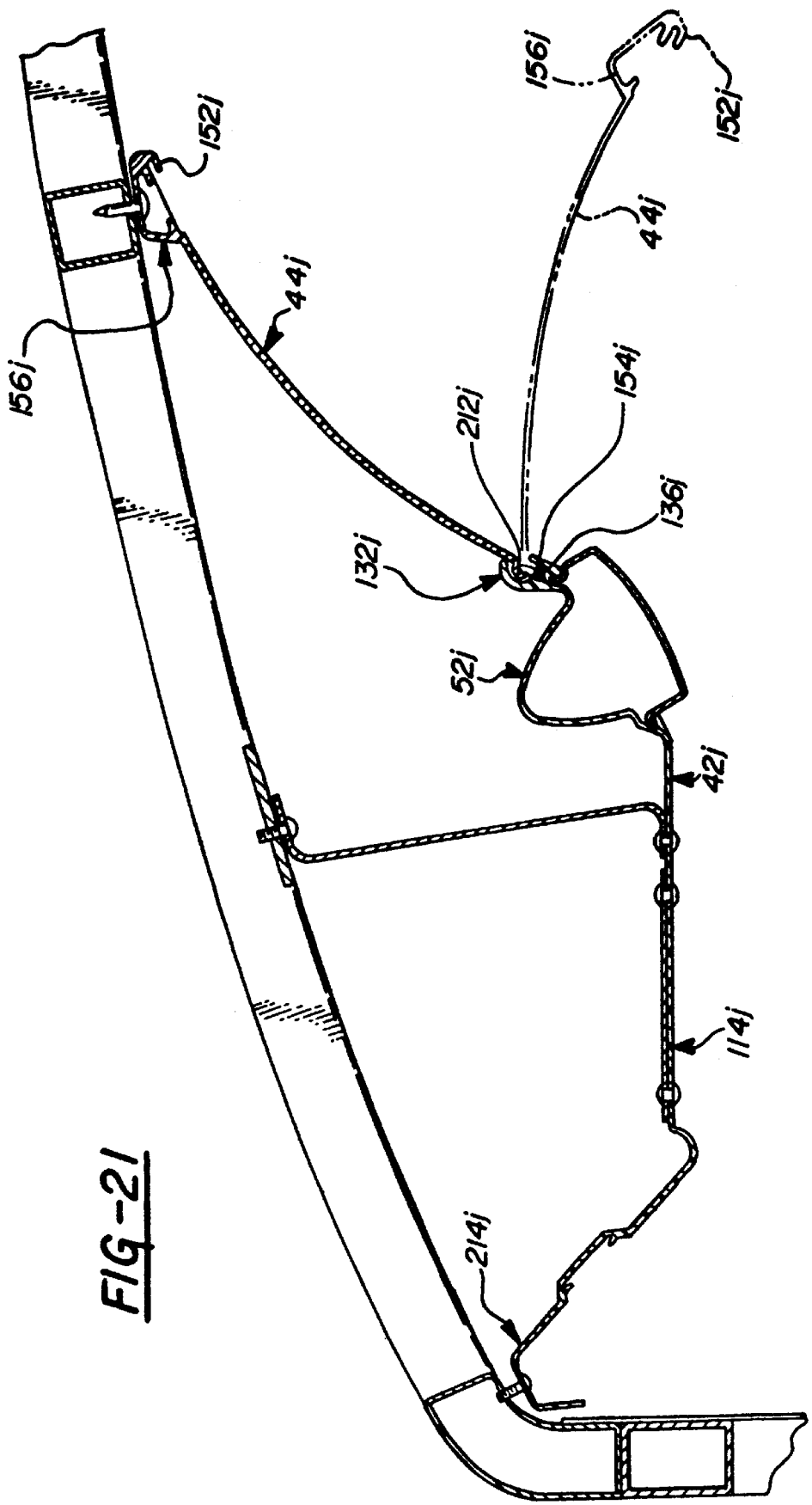
FIG. 21 is a cross-sectional end view of a variant of the fifth light fixture embodiment constructed in accordance with this invention.

In still another possible variation on the fifth embodiment, each lamp housing 52*f* is integrally formed as a unitary piece with a duct extension panel 114*f* instead of a face panel 42*f* A light fixture constructed according to this variation on the fifth embodiment is shown at 42*j* in FIG. 21. As shown in FIG. 21, each elongated lamp housing 52*j* is pultruded along with an air duct extension panel 114*j* as a single unitary piece. Each lamp housing 52*j* is formed in a position adjacent and generally parallel to the air duct extension panel inner edge 132*j*. Also according to this variation, each face panel 44*j* is rotatably and detachably connected to a corresponding duct extension panel inner edge 132*j* along the face panel lower edge 136*j* to allow the face panel 44*j* to be removed without removing the lamp housing 52*j*. Alternatively, each face panel 44*j* may be rotatably connected to a corresponding duct extension panel inner edge 132*j* without being readily detachable. According to this alternative construction, the face panel 44*j* could be rotated downward to gain access to the area above the light fixture 42*j* without being disconnected from the duct extension panel inner edge 132*j*.

The seam 212*j* formed where each face panel lower edge 136*j* and each duct extension panel inner edge 132*j* meet is disposed between upper 152*j* and lower 154*j* advertising card holders. In this position, an advertising card positioned between the holders 152*j*, 154*j* will hide the seam 212*j* between each interconnected face panel 44*j* and duct extension panel 114*j*.

According to this variation of the fifth embodiment, the upper mounting flange 156*j* of each face panel 44*j* and the outer edge mounting flange 214*j* of each duct extension panel 114*j* are formed as shown in FIG. 21. Alternatively, the upper mounting flanges 156*j* and outer edge mounting flanges 214*j* may be formed in any one of a number of different configurations adapted to conform to the ceiling and wall configurations of various mass transit vehicle passenger compartments.

Reference numerals with the suffix "g" in FIG. 17, "h" in FIG. 18, "i" in FIG. 19 and "j" in FIG. 21 designate alternative configurations of each element common to the fifth embodiment described above. Unless otherwise indicated, we intend the description of elements in the fifth embodiment to apply equally to elements shown in FIGS. 17, 18, 19 and 21 that carry the same reference numerals, but with suffixes "g", "h", "i" or "j".

This is an illustrative description of the invention using words of description rather than of limitation. Obviously, many modifications and variations of this invention are possible in light of the above teachings. Within the scope of the claims, one may practice the invention other than as described.

We claim:

1. A method for installing a light pipe in a light fixture, the light fixture including an elongated lamp-support panel having an elongated slot extending through a thickness of the lamp-support panel and extending longitudinally along a length of the lamp-support panel, an elongated light pipe, an elongated mounting fin comprising an elongated stem extending from along a length of the light pipe, the mounting fin additionally comprising a first engagement surface disposed adjacent the stem; said method including the steps of:

longitudinally inserting the fin stem into one end of the slot; and sliding the mounting fin longitudinally into an installed position where the fin stem is disposed within and along the length of the slot, the first engagement surface of the fin engages an upper surface of the light fixture and the light pipe is suspended below the lamp-support panel.

2. A method for installing a light pipe in a light fixture, the light fixture including an elongated lamp-support panel having an elongated slot extending through a thickness of the lamp-support panel and extending longitudinally along a length of the lamp-support panel; an elongated light pipe, an elongated mounting fin comprising an elongated stem extending from along the light pipe, the mounting fin further including an elongated apex defining a fin upper edge and a pair of elongated ramp surfaces tapering outward and downward from along the apex to an outer edge of each of two fin engagement surfaces to form elongated barbs; said method including the steps of:

laterally inserting the fin upper edge into the slot along the length of the slot with the elongated fin ramp surfaces engaging a lower surface of the lamp support panel; and moving the light pipe mounting fin into the elongated slot so that the elongated barbs first compress inward against the elongated stem and then snap back outward after passing through the slot to retain the light pipe in an installed position with the fin stem disposed in the slot with the barbs spread-out over and above the slot and the light pipe suspended below the slot.

3. A method for installing a light pipe in a light fixture including the steps of:

providing a lamp support panel having an elongated slot extending through a thickness of the lamp-support panel and extending longitudinally along a length of the lamp-support panel;

providing an elongated light pipe including an elongated mounting fin comprising an elongated stem extending from along the light pipe, the mounting fin additionally comprising a first engagement surface disposed adjacent the stem;

longitudinally inserting the fin stem into one end of the slot; and sliding the mounting fin longitudinally into an installed position where the fin stem is disposed within and along the length of the slot, the first engagement surface of the fin engages an upper surface of the light fixture and the light pipe is suspended below the lamp-support panel.

4. A method for installing a light pipe in a light fixture including the steps of:

providing an elongated lamp-support panel having an elongated slot extending through a thickness of the lamp-support panel and extending longitudinally along a length of the lamp-support panel;

providing an elongated light pipe having an elongated mounting fin comprising an elongated stem extending from along the light pipe, the mounting fin further including an elongated apex defining a fin upper edge and a pair of elongated ramp surfaces tapering outward and downward from along the apex to an outer edge of each of two fin engagement surfaces to form elongated barbs;

laterally inserting the fin upper edge into the slot along the length of the slot with the elongated fin ramp surfaces engaging a lower surface of the lamp support panel; and moving the light pipe mounting fin into the elongated slot so that the elongated barbs first compress inward against the elongated stem and then snap back outward after passing through the slot to retain the light pipe in an installed position with the fin stem disposed in the slot with the barbs spread-out over and above the slot and the light pipe suspended below the slot.

\* \* \* \* \*